United States Patent [19]
Kobayashi et al.

[11] Patent Number: 5,936,207
[45] Date of Patent: Aug. 10, 1999

[54] VIBRATION-TRANSMITTING TABLET AND COORDINATE-INPUT APPARATUS USING SAID TABLET

[75] Inventors: Katsuyuki Kobayashi, Yokohama; Atsushi Tanaka, Yamato; Yuichiro Yoshimura, Kamakura; Ryozo Yanagisawa, Inzaimachi; Masaki Tokioka, Fujisawa; Hajime Sato, Yokohama, all of Japan

[73] Assignee: Canon Kabushiki Kaisha, Tokyo, Japan

[21] Appl. No.: 08/683,222

[22] Filed: Jul. 18, 1996

[51] Int. Cl.$^6$ .............................. G08C 21/00; G09G 5/00
[52] U.S. Cl. .................................... 178/18.01; 178/18.03; 178/18.04; 345/176; 345/177
[58] Field of Search ..................................... 345/175, 176, 345/177, 179; 178/18.01, 18.03, 18.04, 19.02, 20.01

[56] References Cited

U.S. PATENT DOCUMENTS

| | | | |
|---|---|---|---|
| 4,833,279 | 5/1989 | Chen et al. | 178/18 |
| 4,886,943 | 12/1989 | Suzuki et al. | 178/18 |
| 4,887,245 | 12/1989 | Mori et al. | 367/129 |
| 4,897,510 | 1/1990 | Tanaka et al. | 178/18 |
| 4,931,965 | 6/1990 | Kaneko et al. | 178/18 |
| 4,980,518 | 12/1990 | Kobayashi et al. | 345/177 |
| 5,017,913 | 5/1991 | Kaneko et al. | 340/177 |
| 5,097,102 | 3/1992 | Yoshimura et al. | 178/18 |
| 5,142,106 | 8/1992 | Yoshimura et al. | 178/18 |
| 5,177,472 | 1/1993 | Taniishi | 345/179 |
| 5,239,138 | 8/1993 | Kobayashi et al. | 178/18 |
| 5,500,492 | 3/1996 | Kobayashi et al. | 178/18 |
| 5,539,678 | 7/1996 | Tanaka et al. | 364/561 |
| 5,565,893 | 10/1996 | Sato | 345/177 |
| 5,570,299 | 10/1996 | Tokioka | 178/18 |

FOREIGN PATENT DOCUMENTS

| | | |
|---|---|---|
| 63-00619 | 1/1988 | Japan . |
| 5-60615 | 9/1993 | Japan . |

*Primary Examiner*—Vijay Shankar
*Attorney, Agent, or Firm*—Fitzpatrick, Cella, Harper & Scinto

[57] ABSTRACT

A vibration-transmitting tablet and coordinate-input apparatus at low prices, which enable to easily manage precision of vibration detection position. A vibration-input pen inputs vibration, generated by its vibrator, onto the vibration-transmitting tablet formed by polarizing a piezoelectric member in its thickness direction. When the vibration propagated on the vibration-transmitting tablet reaches four electrodes provided at predetermined positions of the vibration-transmitting tablet, electric signals based on the vibration are detected from the respective electrodes. A signal-waveform detector detects arrival of the vibration at the electrodes based on the electric signals. An arithmetic controller calculates coordinates of the vibration-input position based on arrival timings of the vibration. The arrangement of the electrodes on the vibration-transmitting tablet can be realized by etching, printing or the like, thus management of precision of vibration-detection positions can be much easier.

21 Claims, 13 Drawing Sheets

VIBRATION-TRANSMITTING TABLET AND COORDINATE-INPUT APPARATUS USING SAID TABLET

BACKGROUND OF THE INVENTION

This invention relates to a vibration-transmitting tablet and manufacturing method of the tablet and coordinate-input apparatus. More particularly, the present invention relates to a coordinate-input apparatus which detects elastic-wave vibration, inputted from a vibration source and propagated on a vibration-transmitting tablet as a coordinate input surface, and obtains the position (coordinate) of vibration source based on transmitting time of the elastic-wave vibration on the vibration-transmitting tablet, and vibration-transmitting tablet used in the coordinate-input apparatus and manufacturing method of the vibration-transmitting tablet.

Conventionally, a method for calculating the distance between two points by utilizing an ultrasonic wave is known. Such a method is applied to a coordinate input apparatus disclosed in Japanese Patent Publication No. 5-60615, for example. The apparatus generates vibration by inputting vibration, from a coordinate-input pen as a coordinate-input designation tool, onto a vibration-transmitting tablet as a coordinate input surface. The vibration is detected by a plurality of sensors attached to the vibration-transmitting tablet. The coordinate position where the vibration has been input is calculated by measuring respective time periods from the point where the vibration has been inputted to points where the vibration reaches the sensors (see FIG. 9).

In this apparatus, a coordinate position designated by the coordinate-input pen can be outputted to an information processing apparatus such as a personal computer, thus characters and figures can be easily inputted into the information processing apparatus.

However, the above conventional art has the following problems.

In the conventional coordinate-input apparatus, the vibration from the coordinate input pen, that generates vibration as the coordinate-input designation tool, is detected, via the tablet by a plurality of sensors (vibration detecting devices) attached to the vibration-transmitting tablet. This thickens the apparatus by the thickness of the sensors, and in a case where the apparatus is constructed into a portable type apparatus, for example, a problem occurs in portability of the apparatus.

Further, this coordinate-input apparatus has its operational principle to respectively obtain the distances between the coordinate-input point and the respective sensors, and output the position of the input pen based on the obtained distance information. To calculate the coordinate position with high precision, the absolute positions of the sensors must be precisely positioned and the sensors must be fixed at the absolute positions. Accordingly, in manufacturing the apparatus, the positions of sensors must be strictly managed. In case of mass production, productivity is lowered due to this management of the sensor positions, which results in manufacturing of the apparatus with high costs.

SUMMARY OF THE INVENTION

The present invention has been made in consideration of the above situation, and has its object to provide a vibration-transmitting tablet, which enables to easily manage precise vibration-detection positions, by forming the vibration detecting tablet utilizing piezoelectric material, and method for manufacturing the vibration-transmitting tablet.

Another object of the present invention is to provide a coordinate input apparatus which is thin and has excellent portability, by using a vibration-transmitting tablet that attains the above object to reduce the thickness of the apparatus.

According to the present invention, the foregoing objects are attained by providing a vibration-transmitting tablet comprising: a tablet member having a piezoelectric member polarized in its thickness direction; and a plurality of electrodes, provided at predetermined positions on the tablet member, for detecting electric signals at the respective positions.

In accordance with the present invention as described above, the tablet member comprises a piezoelectric member, and the transmitted mechanical vibration can be detected as electric signals by the electrodes provided on the tablet member. The arrangement of the electrodes can be realized by etching or a printing technique, thus management of the precision in positioning the electrodes can be much easier. Further, as it is possible to form the vibration-transmitting tablet to be very thin, thus, the thickness of the apparatus can be reduced.

Preferably, in the vibration-transmitting tablet, the plurality of electrodes are formed by providing conductive members, having approximately the same size, at the predetermined positions on both surfaces of the tablet member.

Preferably, in the vibration-transmitting tablet, the plurality of electrodes are formed by using a conductive member, covering approximately all of one surface of the tablet member, and conductive members, provided at the predetermined positions on the other surface of the tablet member.

As the electrode is arranged on one surface of the tablet member so as to cover approximately all the surface. Thus, regarding the surface, positioning of the electrodes is not necessary and the management of precision in positioning of the electrodes can be easier. In addition, noise can be eliminated by connecting the electrodes covering the surface to, e.g., the ground.

Further, according to another aspect of the present invention, the vibration-transmitting tablet can be manufactured by a vibration-transmitting tablet manufacturing method comprising: a first formation step of forming electrodes on both surfaces of a piezoelectric tablet member; a polarization step of applying a predetermined voltage to the tablet member via the electrodes and polarizing the tablet member in its thickness direction; a second formation step of forming electrodes for outputting electric signals from the tablet member by eliminating electrodes other than electrodes at predetermined positions on the tablet member.

In accordance with the present invention as described above, the electrodes for detecting vibration are formed by using some parts of the electrodes formed for polarization of the tablet member. The elimination of unnecessary electrodes at the second formation step can be realized by using, e.g., an etching technique. In this case, photographic techniques such as exposure processing can be applied to eliminate the unnecessary electrodes, which attains easy management of precision in positioning of the electrodes. Further, the electrodes used at the manufacturing process of polarization can be effectively utilized.

Further, according to another aspect of the present invention, the vibration-transmitting tablet can be manufactured by a vibration-transmitting tablet manufacturing method comprising: a formation step of forming a plurality of electrodes of a predetermined size at a plurality of predetermined positions on both surfaces of a piezoelectric tablet member; and a polarization step of applying a predetermined voltage to the tablet member via the plurality of electrodes formed at the formation step, and polarizing the tablet member in its thickness direction.

In accordance with the present invention as described above, electrodes of a predetermined size are formed at predetermined positions, and polarization processing is performed by using these electrodes. The formed electrodes serve as electrodes for detecting electric signals corresponding to mechanical vibration.

Preferably, in the vibration-transmitting tablet manufacturing method, at the formation step, the electrodes of the predetermined size are formed on one surface of the tablet member, and forming an electrode covering approximately over all of the other surface of the tablet member.

According to another aspect of the present invention, a coordinate-input apparatus that attains the foregoing objects can be obtained by using the vibration-transmitting tablet, as described above, and manufactured by the manufacturing method according to the present invention. That is, the coordinate-input apparatus according to the present invention comprises a coordinate-input apparatus comprising: a vibration-transmitting tablet being polarized in its thickness direction and having piezoelectricity; a plurality of electrodes provided at a plurality of predetermined positions on both surfaces of the vibration-transmitting tablet; vibration-input means for generating vibration and inputting the generated vibration onto the vibration-transmitting tablet; detection means for obtaining electric signals generated by the vibration inputted by the vibration-input means and propagated on the vibration-transmitting tablet to the electrodes and detecting arrival of the vibration at the electrodes based on the electric signals; calculation means for calculating coordinates of an input position of the vibration, based on timings of detection of the arrival of the vibration at the electrodes by the detection means; and output means for outputting coordinate data calculated by the calculation means.

In accordance with the present invention as described above, the vibration generated by the vibration input means is inputted onto the vibration transmitting tablet having piezoelectricity. As the vibration propagated on the vibration-transmitting tablet reaches the plurality of electrodes provided at the predetermined positions, electric signals based on the vibration can be detected from the respective electrodes. The detection means detects arrival of the vibration at the respective electrodes based on the electric signals. Then, based on arrival timings of the vibration, coordinates of the vibration input position can be calculated.

Preferably, in the coordinate-input apparatus, the calculation means measures time from a point of generation of the vibration by the vibration-input means to a point of detection of the vibration by the detection means, calculates distances between the input position of the vibration and the electrodes based on the measured time, and calculates the coordinates of the input position based on the distances. The distances between the vibration input position and the electrodes can be directly calculated by measuring time from a point at which the vibration has been generated by the vibration input means to the point at which the vibration reaches the respective electrodes. This improves precision of coordinate data.

Further, the reliability of coordinate data can be improved by providing more than the number of electrodes necessary (two or three) for calculating the coordinate data and obtaining the coordinate data by plural types of combination of electrodes.

Preferably, in the coordinate-input apparatus, the calculation means detects distance differences among distances between the input position and the electrodes, based on the time differences, and calculates the coordinates of the input position based on the distance differences. As the coordinate data can be obtained from the difference among arrival timings of the vibration at the respective electrodes, vibration generation timing by the input means need not be confirmed. This enables the input means and the calculation means to operate independently, thus attains a cordless vibration generator such as a cordless input pen.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

<Construction of Coordinate-Input Apparatus>

Figure 1:
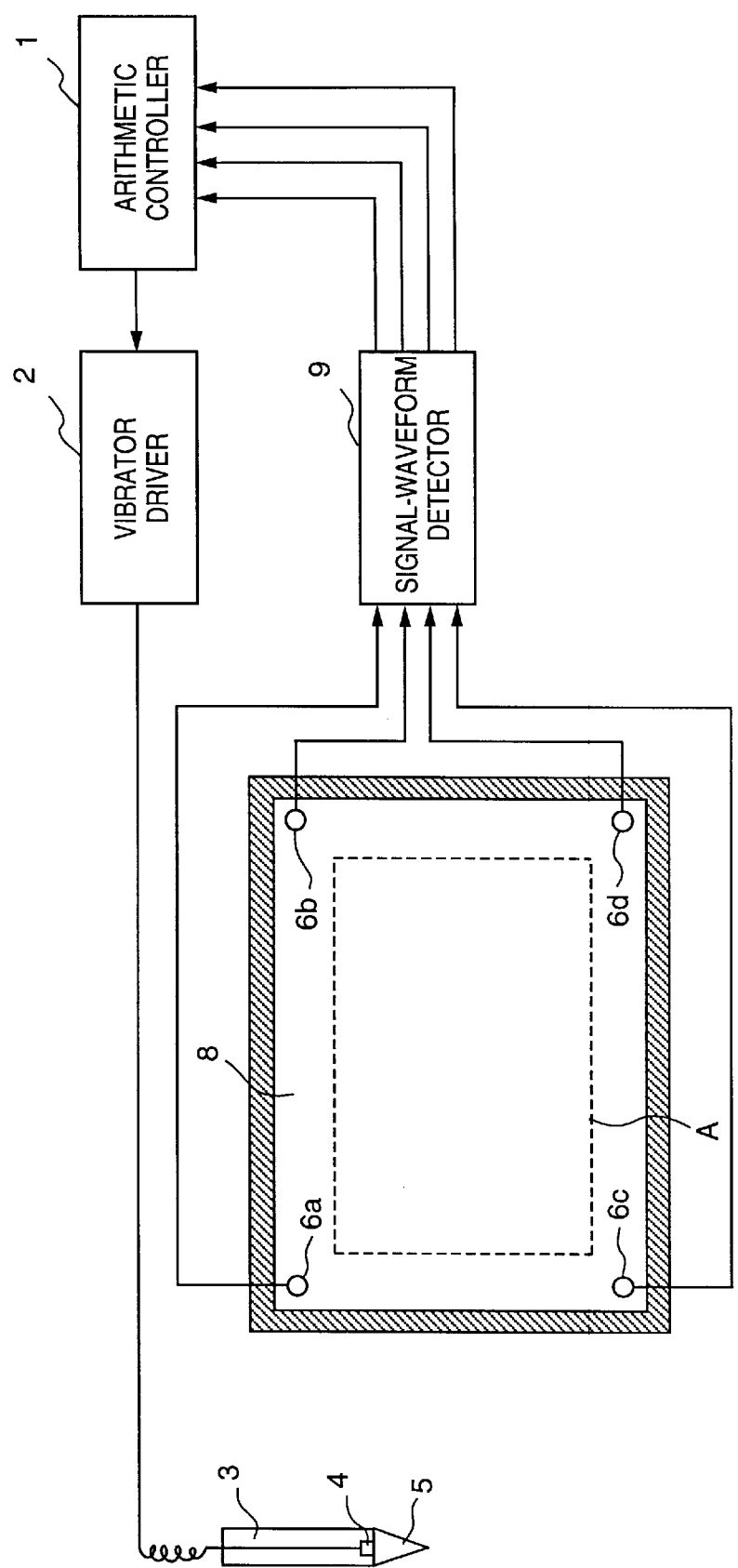
FIG. 1 is a block diagram schematically showing the construction of a coordinate-input apparatus according to a first embodiment of the present invention.

First, the construction of a coordinate-input apparatus according to a first embodiment of the present invention will be described with reference to FIG. 1. FIG. 1 is a block diagram schematically showing the construction of the coordinate-input apparatus.

In FIG. 1, reference numeral 1 denotes an arithmetic controller which controls the overall apparatus and calculates distances L between the vibration input position and respective electrodes 6a to 6d. Numeral 2 denotes a vibrator driver which drives a vibrator 4 included in a vibration-input pen 3 to vibrate. The vibration generated by the vibrator 4 is inputted onto a vibration-transmitting tablet 8 via a contact member 5. The vibration-transmitting tablet 8 comprises a piezoelectric ceramic tablet (PZT). The input of the vibration from the vibration source (vibration-input pen) 3 is made by touching the vibration-transmitting tablet 8 by the contact member 5.

The vibration inputted by the vibration-input pen 3 onto the vibration-transmitting tablet 8 is mechanical vibration. The mechanical vibration is propagated on the vibration-transmitting tablet 8. Since the vibration-transmitting tablet 8 comprises the piezoelectric ceramic tablet, with transmission of the vibration, electric signals corresponding to the vibration are generated at respective portions on the vibration-transmitting tablet 8. Numerals 6a to 6d denote electrodes for outputting the electric signals generated corresponding to the mechanical vibration transmitted on the vibration-transmitting tablet 8. That is, as shown in FIG. 1, the plurality of electrodes 6a to 6d, formed on the vibration-transmitting tablet 8, output the mechanical vibration as electric signals to the signal-waveform detector 9.

Figure 2:
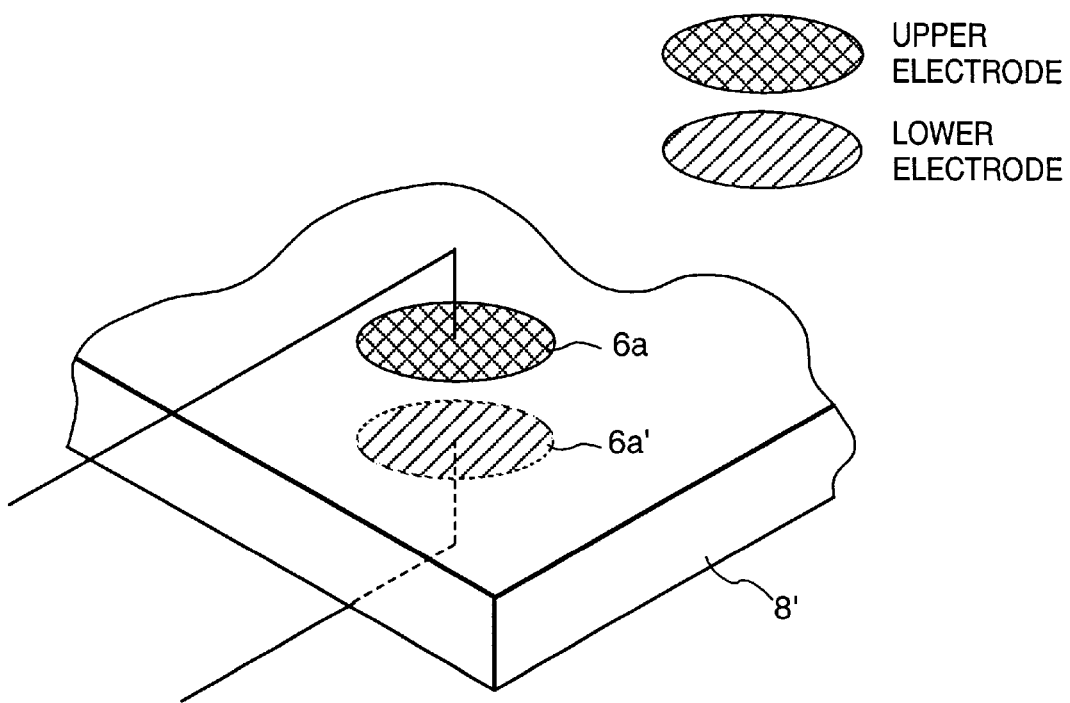
FIG. 2 is a partial perspective view showing an example of the arrangement of electrodes according to the first embodiment.

In this embodiment, the electrodes 6a to 6d are formed at four corners on the front and at the same positions on the rear surfaces of the vibration-transmitting tablet 8. FIG. 2 depicts an example of a spot-like electrode, such that the electrode may be substantially circular, or substantially elliptical in shape. FIG. 2 shows an example of the arrangement of the electrodes in the present embodiment. In FIG. 2, the electrode 6a and an electrode 6a' are formed at corresponding positions on both surfaces of the vibration-transmitting tablet 8. The electrodes are obtained by forming electrodes all over both surfaces of the vibration-transmitting tablet in order to polarize the piezoelectric member constituting the vibration-transmitting tablet 8 in its thickness direction, and processing the electrodes by etching or the like, into the forms as shown in FIG. 2. Otherwise, the electrodes as shown in FIG. 2 can be obtained by printing conductive material on the piezoelectric material. In this case, the vibration-transmitting tablet may be formed by using the electrodes formed as shown in FIG. 2 for polarization of the piezoelectric member.

Figure 3:
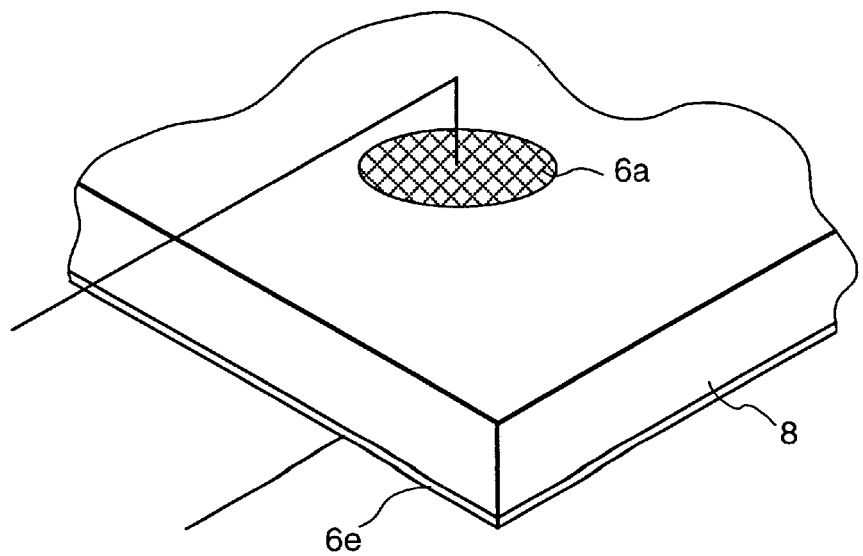
FIG. 3 is a partial perspective view showing another example of the arrangement of electrodes according to the first embodiment.

Although the electrodes in FIG. 2 are arranged at corresponding positions on both surfaces of the vibration-transmitting tablet, the present invention is not limited to this arrangement. FIG. 3 shows another example of the arrangement of the electrodes. As shown in FIG. 3, an electrode may be formed all over one surface (as 6e in FIG. 3), and individual electrodes (6a to 6d) may be formed on the other surface. In this arrangement, if the electrode formed all over the surface is connected to, e.g., the ground, electric noise can be effectively eliminated. Further, in comparison with FIG. 2, the arrangement in FIG. 3 does not need alignment of the electrodes on both surfaces of the vibration-transmitting tablet, thus attaining manufacture of electrodes with ease and at low costs.

Hereinafter, a procedure for manufacturing the vibration-transmitting tablet according to the present embodiment will be described. FIGS. 10A to 10D show an example of the manufacturing process of the vibration-transmitting tablet.

Figure 10A:
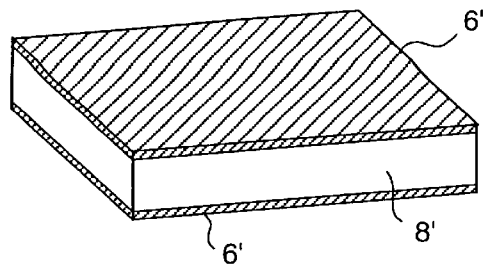
FIGS. 10A to 10D are perspective views showing a manufacturing process of a vibration-transmitting tablet according to the first embodiment.
Figure 10B:
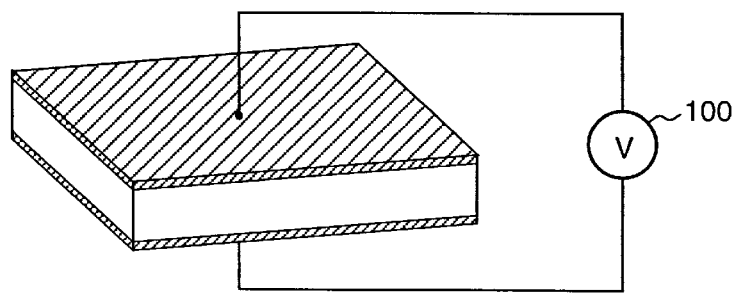
Figure 10C:
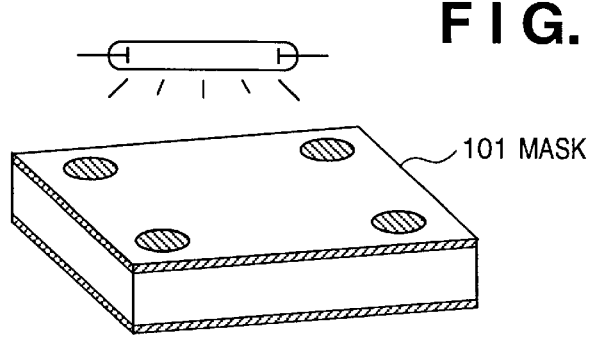
Figure 10D:
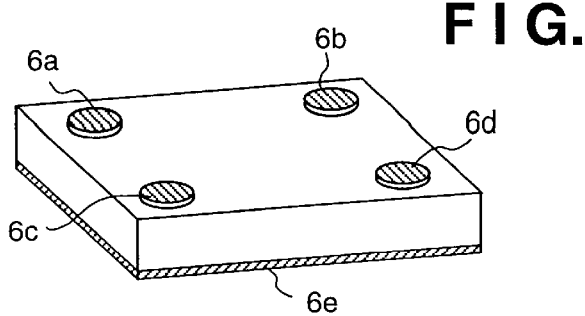

First, in FIG. 10A, electrode 6' is formed all over both surfaces of a vibration-transmitting tablet 8' comprising a piezoelectric ceramic member for polarization. Next, as shown in FIG. 10B, a high voltage is applied from a power source 100 to the vibration-transmitting tablet 8' such that the tablet 8' is polarized in its thickness (height) direction. Next, as shown in FIG. 10C, photosensitive material is applied to the electrode 6', then the electrode 6' is masked except electrode-forming portions, and the masked electrode 6' is exposure-processed. After the exposure, etching is performed on the surface of the tablet, to eliminate unexposed electrode portions. Thus, the electrodes 6a to 6d as described in FIGS. 1 to 3 are formed. If the same processing is performed on the other surface, the electrodes as shown in FIG. 2 can be obtained. However, if the etching is not performed on the other surface, the electrodes as shown in FIG. 3 can be obtained.

Figure 14:
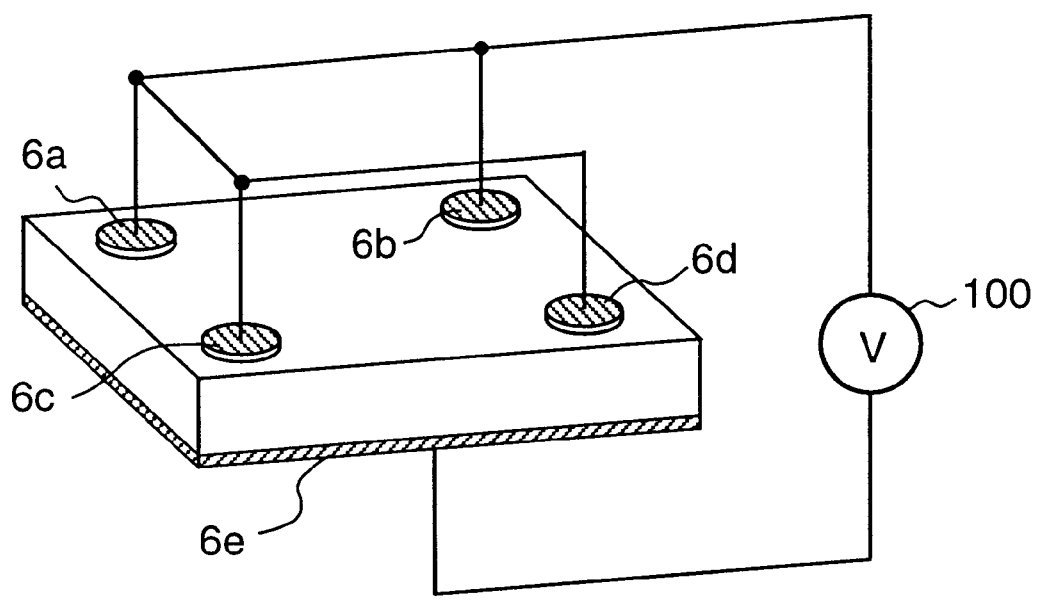
FIG. 14 is a perspective view showing polarization process after forming electrodes.
Figure 1:
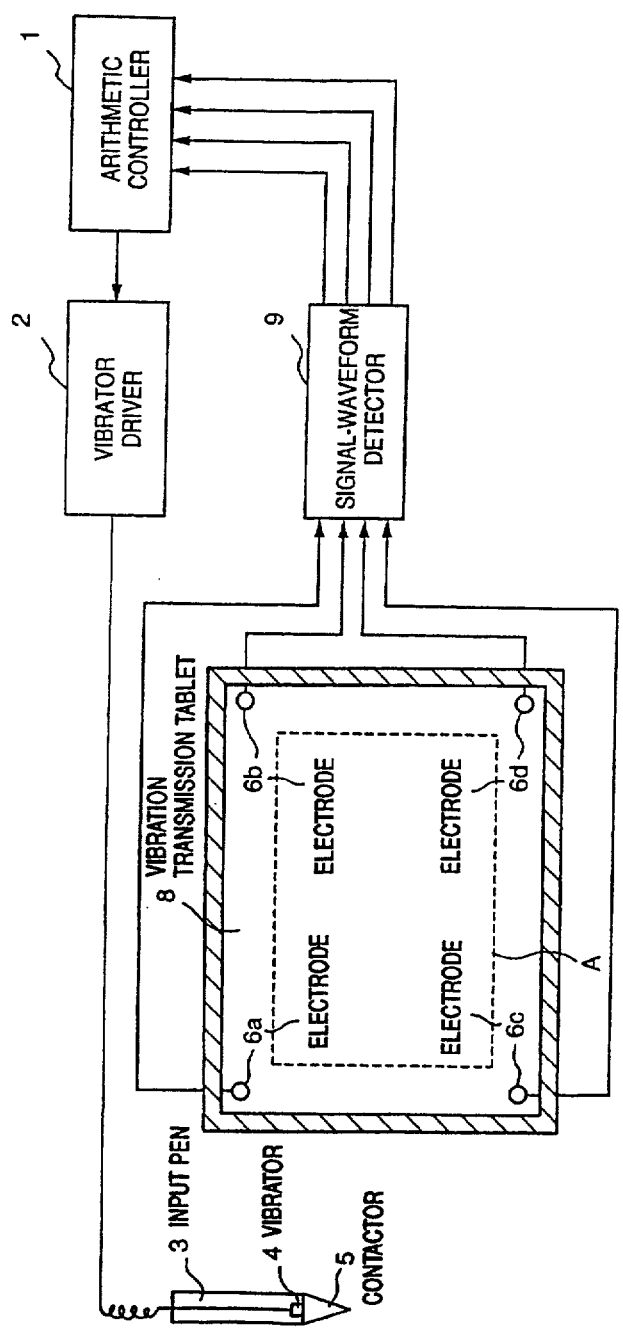

Note that as shown in FIG. 14, polarization may be performed after electrodes in FIG. 2 or 3 have been formed.

The signals obtained from the electrodes 6a to 6d are amplified by an amplifier (not shown), and transferred to the signal-waveform detector 9. The signal-waveform detector 9 performs signal processing, and outputs the result of processing to the arithmetic controller 1. The arithmetic controller 1 calculates coordinates based on the output from the signal-waveform detector 9. Note that the signal-waveform detector 9 and the arithmetic controller 1 will be described in detail later.

The vibrator 4 included in the vibration-input pen 3 as the vibration source is driven by the vibrator driver 2. A drive signal for the vibrator 4 is supplied, as a pulse signal at a low-voltage level, from the arithmetic controller 1, then amplified by the vibrator driver 2 with a predetermined gain, and applied to the vibrator 4. The electrical drive signal is converted by the vibrator 4 into mechanical ultrasonic-wave vibration, and transmitted to the vibration-transmitting tablet 8 via the contact member (probe) 5.

In the present embodiment, a vibration frequency of the vibrator 4 is selected to a value to cause a Lamb wave (plate wave) on the vibration-transmitting tablet 8 comprising a piezoelectric ceramic member or the like. In this case, if the vibration frequency of the vibrator 4 is set as a resonance frequency to cause resonance vibration, including the contact member 5, efficient vibration conversion can be made.

The elastic wave generated on the vibration-transmitting tablet 8 is a Lamb wave which is not easily influenced by scratches or foreign materials on the surface of the vibration-transmitting tablet, in comparison with a surface wave. The elastic wave is not limited to the plate waves, depending upon purpose, but vibration such as a surface wave can be used.

<Arithmetic Controller (FIG. 4)>

In the above-described construction, the arithmetic controller 1 outputs the drive signal for the vibrator 4 in the vibration source 3 via the vibrator driver 2, at predetermined intervals (e.g., 5 ms), and at the same time, starts time measurement by using internal timer (comprising a counter). The vibration inputted by the vibration-input pen 3 onto the vibration-transmitting tablet 8 arrives at the electrodes 6a to 6d, delayed in accordance with the respective distances from the vibration input position.

The signal-waveform detector 9 detects the signals from the electrodes 6a to 6d, and generates signals indicative of respective vibration-arrival timings at the electrodes 6a to 6d by waveform-detection processing to be described later. The arithmetic controller 1 inputs the signals, detects transmission time from the point of vibration-input to points of arrival of the vibration at the respective electrodes, calculates the distances between the vibration-input pen 3 and the electrodes 6a to 6d, and calculates coordinates of the vibration-input position by a method to be described later. The arithmetic controller 1 outputs the calculated coordinate value to an external device such as a host computer (not shown) by serial or parallel communication.

Figure 4:
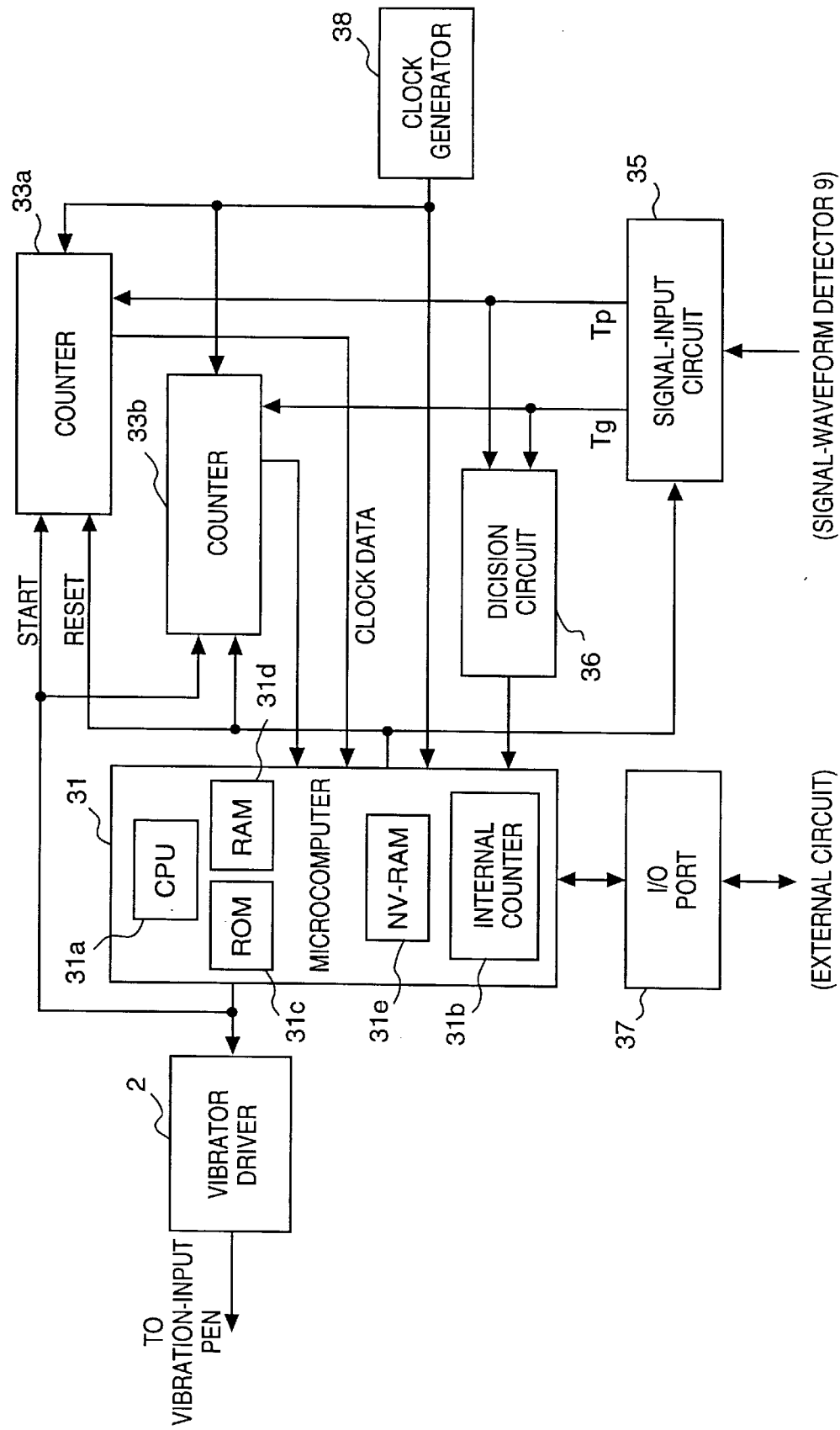
FIG. 4 is a block diagram schematically showing the construction of an arithmetic controller 1 according to the first embodiment.

FIG. 4 is a block diagram showing the construction of an arithmetic controller 1 according to the first embodiment. The respective elements of the arithmetic controller 1 and the operation of the components will be described below with reference to FIG. 4.

In FIG. 4, numeral 31 denotes a microcomputer in the arithmetic controller 1 and the overall coordinate-input apparatus. The microcomputer 31 comprises a CPU 31a which performs various controls, an internal counter 31b, a ROM 31c in which operation procedures are stored, a RAM 31d which is used as a work area upon coordinate calculation, and a non-volatile memory (NV-RAM) 31e for storing constants necessary for distance calculation (e.g., constants related to sonic velocity such as a frequency f, phase velocity Vg, and group velocity Vp). Note that the internal counter 31b counts a reference clock from a clock generator 38, and determines timing for outputting the drive signal to the vibrator driver 2 for driving the vibrator 4. Numerals 33a and 33b denote timers, comprising a counter or the like, which count the reference clocks from the clock generator 38 (hereinafter, these timers will be referred to as "counters").

When a start signal to start driving of the vibrator 4 in the vibration-input pen 3 is inputted into the vibrator driver 2, the counter 33a for measuring phase delay time tp and the counter 33b for measuring group delay time tg start time measurement. This synchronizes timings of the start of time measurement and the generation of vibration in the vibration-input pen 3, thus enabling measurement of delay time from the input of vibration to detection of the vibration.

Note that the present embodiment shows only a couple of counters, however, it may be arranged in a case where outputs are obtained from four electrodes, as this embodiment, such counters are provided corresponding to the respective electrodes, otherwise, a signal-input circuit 35 to be described later time-sequentially divides the signals from the electrodes to obtain necessary delay time. In this construction, each time the vibration-input pen 3 inputs vibration, the signals from the electrodes are processed. Accordingly, if the number of necessary signals from the electrodes is two, coordinate calculation can be made after the vibration-input pen 3 has inputted vibration twice.

The signal-waveform detector 9 outputs vibration arrival timing signals (arrival-timing signal Tp of the phase delay time tp related to the Lamb wave phase velocity Vp, and arrival-timing signal Tg of the group delay time tg related to the group velocity Vg) regarding the electrodes 6a to 6d, and the timing signals are inputted into the counters 33a and 33b via the signal-input circuit 35. The counters 33a and 33b then stop counting operation and latch the respective time-measurement values at that time. As a decision circuit 36 determines that these timing signals have been outputted, it outputs a signal indicative of the determination to the microcomputer 31. The microcomputer 31 receives the signal from the decision circuit 36, reads vibration-arrival time from the counters 33a and 33b, performs a predetermined calculation to obtain the distances between the vibration-input pen 3 and the respective electrodes on the vibration-transmitting tablet 8, and coordinates of the vibration-input point. Then, the microcomputer 31 outputs the calculation results as distance information (coordinate information), via an I/O port 37, to the external information processing device or the like.

<Detection of Vibration Transmission Time (FIGS. 5 and 6)>

Figure 5:
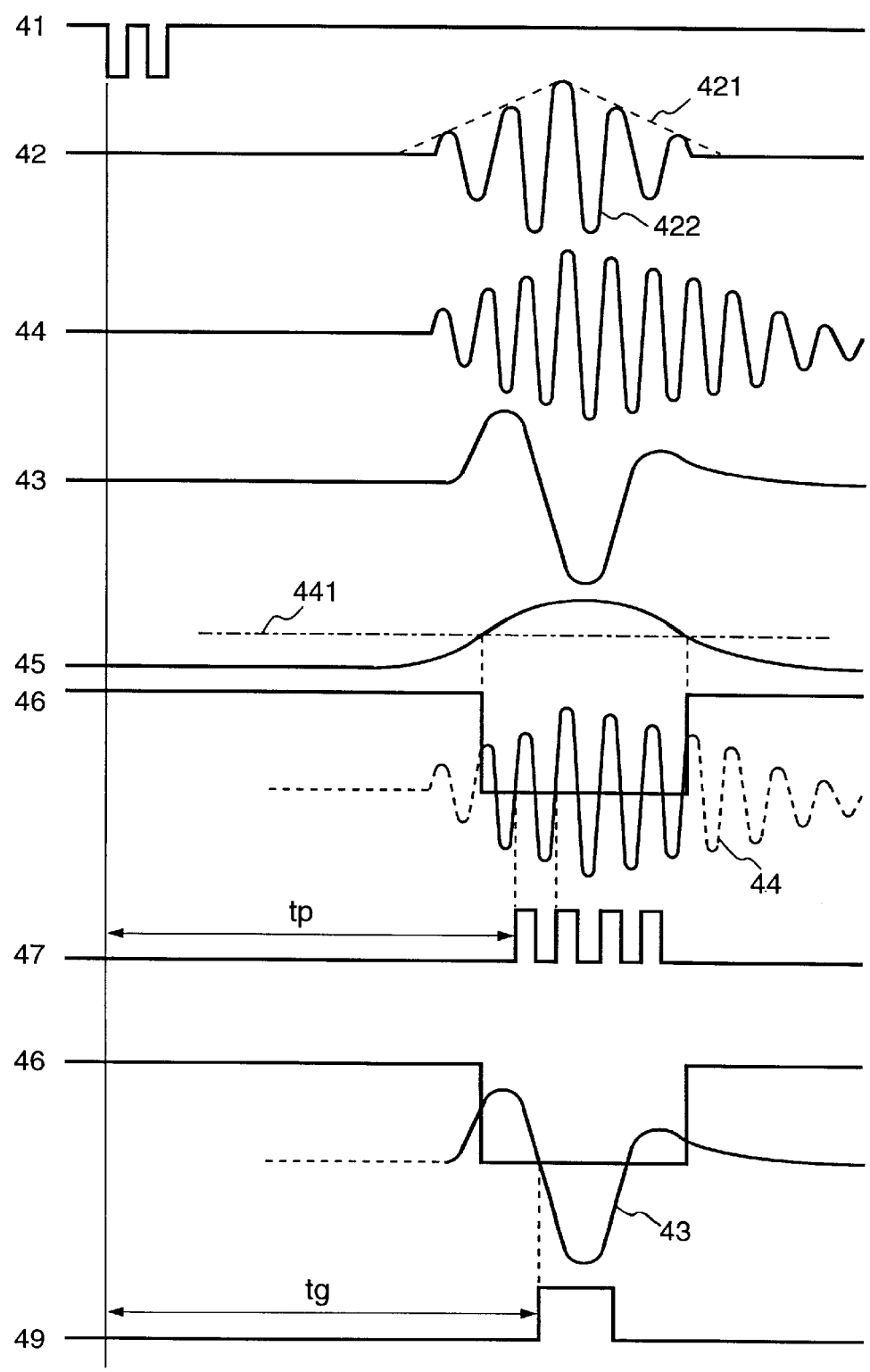
FIG. 5 is a timing chart for explaining detected waveforms inputted into a signal-waveform detector 9 and processing to measure vibration-transmission time based on the detected waveforms.

FIG. 5 is a timing chart for explaining detected waveforms inputted into a signal-waveform detector 9 and processing to measure vibration-transmission time based on the detected waveforms.

As described above, the measurement of vibration transmission time from the point of vibration input to the point of detection of the vibration is started at the same time as outputting drive signal for the vibrator 4 to the vibration driver 2. At this time, the vibrator driver 2 outputs a drive signal 41 to the vibrator 4. In accordance with the drive signal 41, the vibration-input pen 3 as the vibration source inputs vibration onto the vibration-transmitting tablet 8, and the vibration proceeds, corresponding to the distances to the respective electrodes 6a to 6d, then it is detected at the electrodes. In FIG. 5, a signal 42 shows a signal waveform detected by the electrodes 6a to 6d.

As described above, since vibration used in this embodiment is a Lamb wave, the velocity of propagation (group velocity Vg) of an envelope 421 of the detected waveform and the velocity of propagation (phase velocity Vp) of a phase 422 are different. Accordingly, the relation between the envelope 421 and the phase 422 changes during the vibration transmission with respect to the propagation distance on the vibration-transmitting tablet, in correspondence with each transmission distance. In this embodiment, the distances between the vibration-input pen 3 and the electrodes 6a to 6d are obtained from the group delay time Tg based on the group velocity Vg, and the phase delay time Tp based on the phase velocity Vp.

Figure 6:
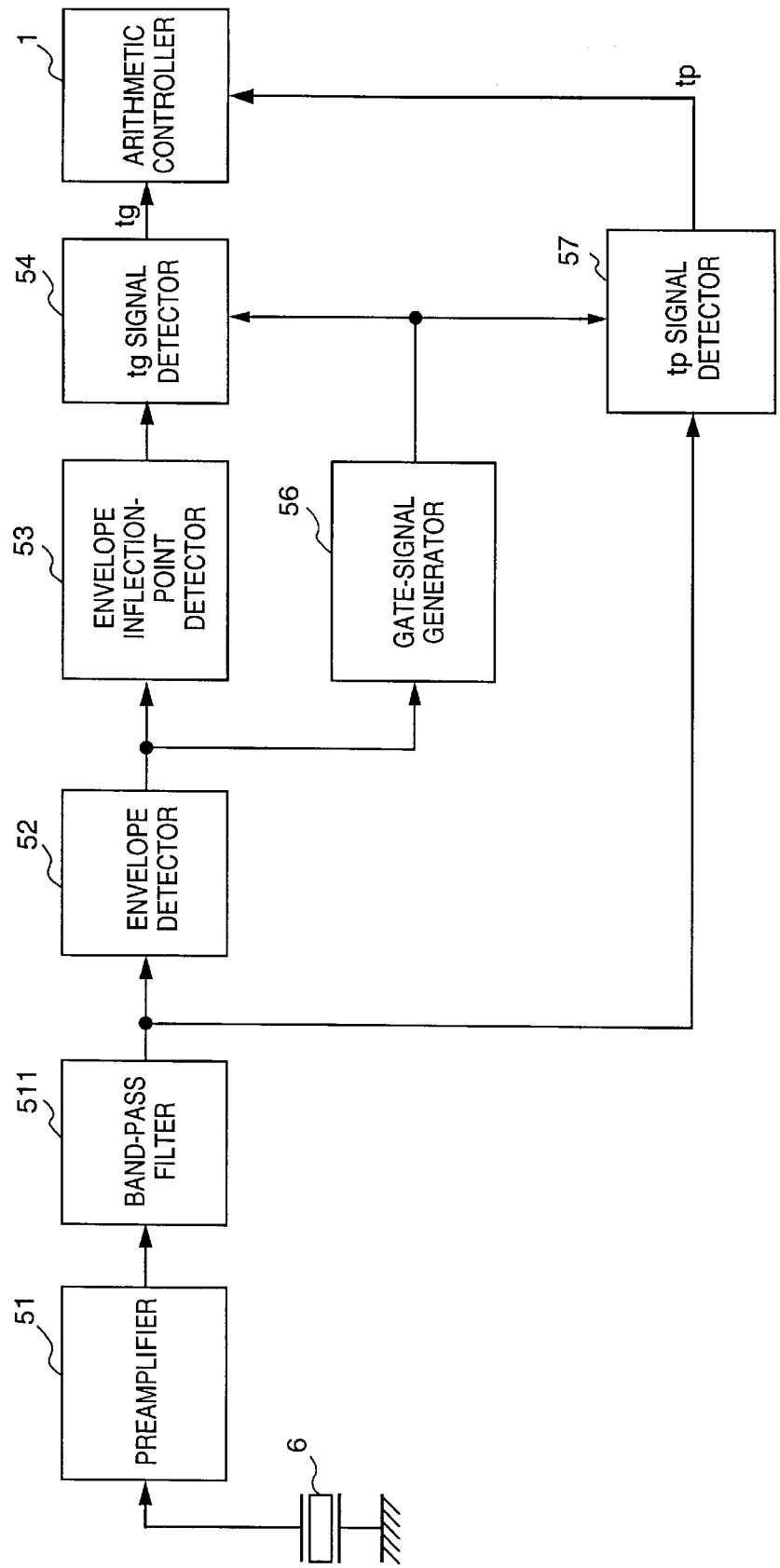
FIG. 6 is a block diagram showing the construction of the signal-waveform detector 9 according to the first embodiment.

FIG. 6 is a block diagram showing the construction of the signal-waveform detector 9 according to the first embodiment. Hereinbelow, the construction for detecting the group delay time Tg and the phase delay time Tp will be described by using FIGS. 5 and 6.

The output signal 42 from the electrodes 6a to 6d is amplified by a preamplifier 51 to a predetermined level. A band-pass filter 511 eliminates unnecessary frequency components from the signal 42 and obtains a signal 44. Regarding the envelope of this signal, the speed of propagation of the waveform is the group velocity Vg. The group delay time tg related to the group velocity Vg is obtained by detecting a particular point on the waveform, e.g., the peak of the envelope or an inflection point of the envelope. The signal 42 amplified by the preamplifier 51 and passed through the band-pass filter 511 is inputted into an envelope detector 52 which comprises an absolute signal generator, a low-pass filter and the like, at which only the envelope 45 of the signal 44 is detected. Further, a gate-signal generator 56 generates a gate signal 46 which indicates a component that exceeds a predetermined threshold level 441 with respect to the envelope 45. Note that the gate signal has a reference level with respect to the component that exceeds to the threshold level 441, however, with respect to the other components, has levels higher than the maximum levels of the detection signal 44 and a signal 43 (to be described later) obtained by differentiating the envelope signal 45 twice.

As described above, the group delay time tg related to the group velocity Vg can be obtained by detecting the peak of the envelope, the envelope-inflection point or the like. In this embodiment, the first inflection point of the envelope (zero-crossing point of a trailing edge of the signal 43 to be described later) is detected. The signal 45 outputted from the envelope detector 52 is inputted into an envelope inflection-point detector 53, at which waveform 43 of a second differential envelope is obtained. A tg signal detector 54 detects the trailing-edge zero-crossing point by comparing the differentiated waveform signal 43 with the gate signal 46, and generates a tg signal 49 by a multivibrator and the like at the detection timing, and inputs the tg signal 49 into the arithmetic controller 1.

Next, detection of the phase delay time tp related to the phase velocity Vp will be described. Numeral 57 denotes a tp signal detector which comprises a zero-cross comparator, a multivibrator and the like, for detecting the phase delay time tp. The tp signal detector 57 detects a zero-crossing point of the first leading edge (the first point at which the phase changes from negative to positive) of the phase signal 44 while the gate signal 46 is open (at the reference level), and based on the detected zero-crossing point, supplies a signal 47 of the phase delay time tp to the arithmetic controller 1.

<Calculation of Distances between Vibration Source and Electrodes (FIG. 7)>

Figure 7:
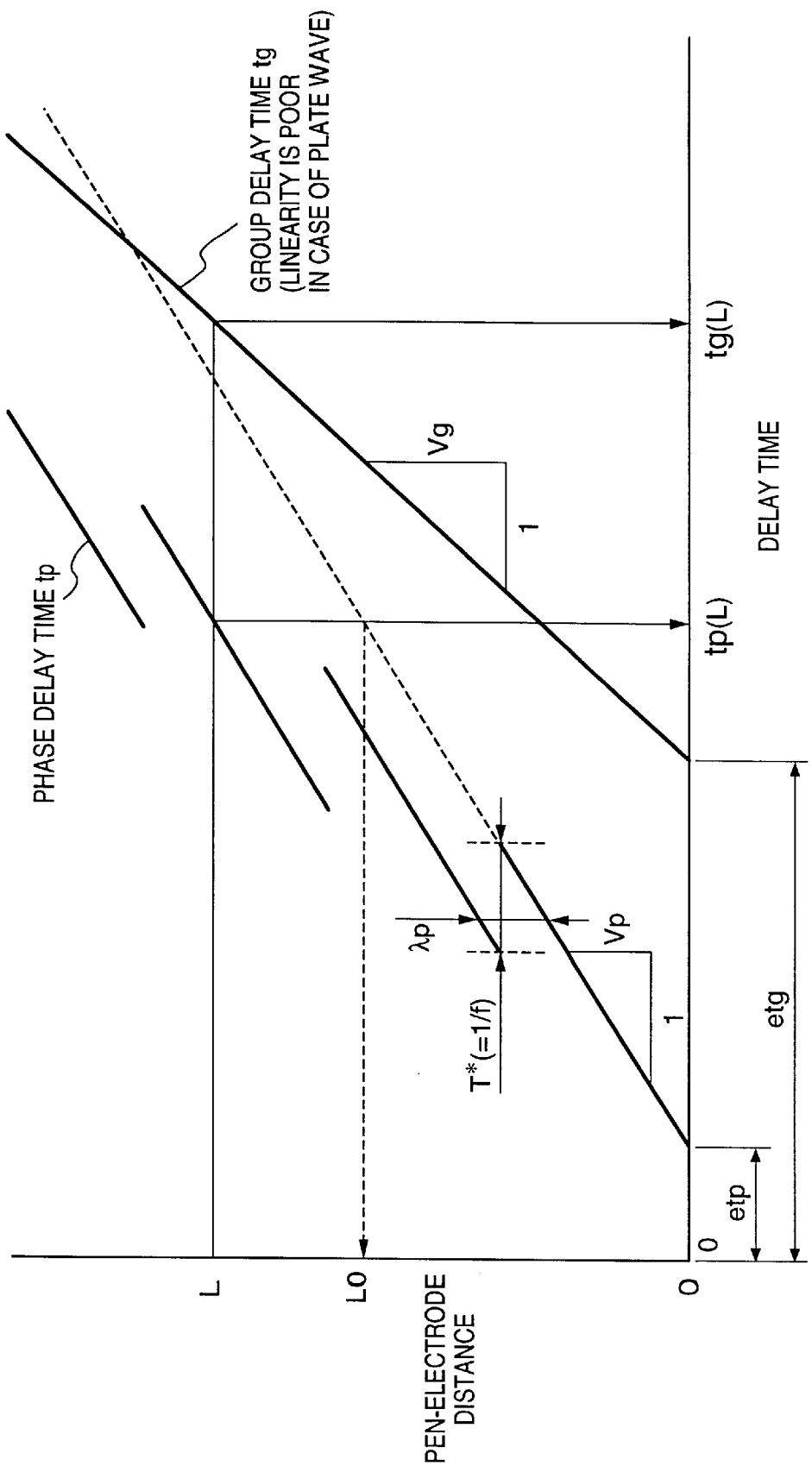
FIG. 7 is a line graph showing the relation among a group delay time tg, a phase delay time tp, and a pen-electrode distance L, obtained in the first embodiment.

Next, a method for calculating the distance between the vibration source and the electrodes from the group delay time tg and the phase delay time tp will be described. FIG. 7 is a line graph showing the relation among the group delay time tg, the phase delay time tp, and pen-electrode distance L, obtained in the first embodiment. The relation between the group delay time tg and the distance L is continuous but has poor linearity. On the other hand, the relation between the phase delay time Tp and the distance L has good linearity but not continuous due to the difference Lamb wave characteristics of the group velocity Vg and the phase velocity Vp.

Wave sonic velocity (group velocity Vg and phase velocity Vp) is obtained from these relations and defined as follows. First, the group velocity Vg is defined by obtaining its slope from the relation between the group delay time Tg and the distance L by a first-order least squares method. The phase velocity Vp is defined by obtaining the slope of respective straight lines by the first-order least squares method, and averaging the values obtained within a measurement distance range. The Lamb wave frequency f is determined by: obtaining the segments of the respective straight lines of the phase delay time tp, using the previously-defined phase velocity Vp, thus obtaining intervals between the straight lines; defining the average of these values as wavelength λp; and defining the frequency f as phase velocity Vp/wavelength λp. The distance calculation using these phase velocity Vp, the group velocity Vg and the frequency f, which are defined as above, provides high precision of distance measurement.

Next, an algorithm of the distance calculation will be described. As described above, the present embodiment uses a Lamb wave as the detection wave, and the linearity between the output group delay time tg and the distance L is poor. Accordingly, if the distance L between the vibration source 3 and the electrode 6 is obtained as a product of the group delay time tg and the group velocity vg as shown in the following equation (1), the distance L cannot be obtained with high precision.

$$L = Vg \cdot tg \quad (1)$$

Then, in order to determine the coordinates with higher precision, calculation by using the phase delay time tp having excellent linearity, is made as the following equation (2):

$$L = Vp \cdot tp + N \cdot \lambda p \quad (2)$$

λp: wavelength of elastic wave
N: integer

The right hand first item in equation (2) indicates a disstance L0 in FIG. 7. In FIG. 7, the difference between the distance L to be obtained and the disstance L0 is an integer multiple of the wavelength λp. In FIG. 7, a width T* between lines is one cycle of the signal waveform 44 on the time axis, and is expressed as T*=1/frequency, otherwise, the width between the lines is expressed as the wavelength λp or a distance axis. Accordingly, the pen-electrode distance L can be precisely obtained by obtaining the integer N. The integer N can be obtained from the above equations (1) and (2):

$$N = INT[(Vg \cdot tg - Vp \cdot tp)/\lambda p + 0.5] \quad (3)$$

This equation indicates that even though the linearity of the relation between the group delay time tg and the distance L is poor, the integer N can be precisely obtained if the error due to the poor linearity stands within ±½ wavelength. By substituting the obtained N into equation (2), the distances L between the vibration-input pen 3 and the respective electrodes 6a to 6d can be precisely measured.

The vibration transmission time, outputted by the above measurement circuit which comprises signal-waveform detector 9 and counters 33a and 33b, includes a phase circuit delay time etp and group circuit delay time etg (see FIG. 7; these times include time while the vibration is propagated in the contact member 5 of the vibration source 3). The error caused by these times is always included, upon transmission of the vibration from the vibration source 3 to the vibration transmitting tablet 8 then to the electrodes 6, by the same amount.

Assuming that vibration transmission time, which is actually measured by a known distance from the electrode (hereinafter this distance will be the distance from each electrode to an origin O, defined as Ra), is tg0*, tp0*, and transmission time which takes to propagate the wave on the vibration-transmitting tablet 8 from the origin O to the electrode, tg0, and tp0, the following relation holds:

$$tg0^* = tg0 + etg \quad (4)$$

$$tp0^* = tp0 + etp \quad (5)$$

On the other hand, the actually-measured values tg* and tp* at an arbitrary input point P are:

$$tg^* = tg + etg \quad (6)$$

$$tp^* = tp + etp \quad (7)$$

The difference between equations (4) and (6), and that between equations (5) and (7) are obtained from:

$$tg^* - tg0^* = (tg + etg) - (tg0 + etg) = tg - tg0 \quad (8)$$

$$tp^* - tp0^* = (tp + etp) - (tp0 + etp) = tp - tp0 \quad (9)$$

The phase circuit delay time etp and the group circuit delay time etg included in each transmission time are eliminated, and real transmission time delay of propagation of the wave on the vibration-transmitting tablet can be obtained. Accordingly, the distance between the vibration-pen 3 and the electrode 6a can be accurately obtained by calculating distances L by using equations (1) to (3):

$$tg = tg^* - tg0^* \tag{10}$$

$$tp = tp^* - tp0^* \tag{11}$$

then, and adding a distance Ra from the electrode 6 to the origin O to the resulted values.

That is, the distance from the electrode 6 to the origin O, and the vibration transmission time tg0* and tp0* measured between electrodes and the origin O at are stored in advance into the non-volatile memory or the like, and the distances between the vibration-input pen 3 and the respective electrodes 6 can be determined based on the stored values.

Note that the above description has been made regarding a Lamb wave. In case of another vibration mode, i.e., mode of vibration where the linearity between the group delay time tg and the distance L is excellent is selected, the distance can be obtained, as shown in equation (1), from the product between the group delay time tg and the group velocity Vg.

<Coordinate Position Calculation (FIG. 8)>

Next, the principle of detecting coordinate position of vibration by the vibration-input pen 3 on the vibration-transmitting tablet 8 will be described.

Figure 8:
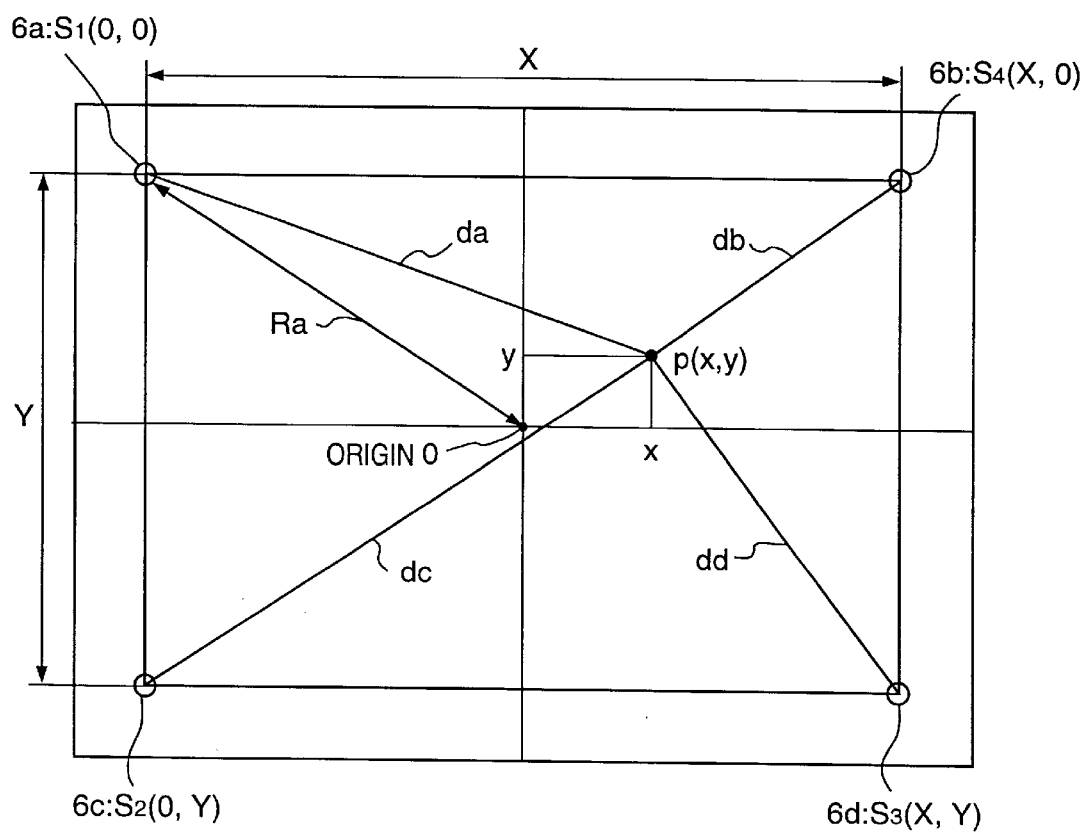
FIG. 8 is an explanatory view showing the principle of coordinate-position detection according to the first embodiment.

FIG. 8 is an explanatory view showing the principle of coordinate-position detection according to the first embodiment.

As shown in FIG. 8, if the four electrodes 6a to 6d are provided at four corner positions S1 to S4 on the vibration-transmitting tablet 8, the straight line distances da to dd from the position P of the vibration-input pen 3 to the respective electrodes 6a to 6d can be obtained based on the above-described principle. Further, at the arithmetic controller 1, coordinates (x,y) of the point P of the vibration-input pen 3 can be obtained by the Pythagorean theorem, based on the straight line distances da to dd:

$$x = (da+db) \cdot (da-db)/2X \tag{12}$$

$$y = (da+dc) \cdot (da-dc)/2Y \tag{13}$$

X: distance between electrodes 6a and 6b
Y: distance between electrodes 6a and 6c Thus, the coordinate of the position of the vibration-input pen 3 can be determined in real-time manner by using equations (12) and (13).

In the above calculation, distance information on the three electrodes is used, while the first embodiment provides four electrodes. Distance information on the remaining one electrode (6d) can be utilized to calculate the coordinates of the position of the vibration-input pen 3 by using another combination of electrodes. Then, the reliability of the output coordinates can be verified by comparing the result to the previously obtained coordinates. Otherwise, an effective area in which coordinates can be inputted can be increased by calculating coordinates, by utilizing distance information of the other three or two electrodes instead of distance information of an electrode having the maximum pen-electrode distance L (as the distance L becomes greater, the detection signal level is lowered and the probability of receiving noise influence becomes greater). Although the coordinate calculation in case of two electrodes has not been described, coordinate calculation is geometrically possible with two or more electrodes. Accordingly, the number of electrodes and positions of the electrodes can be set in correspondence with product specification.

Figure 11:
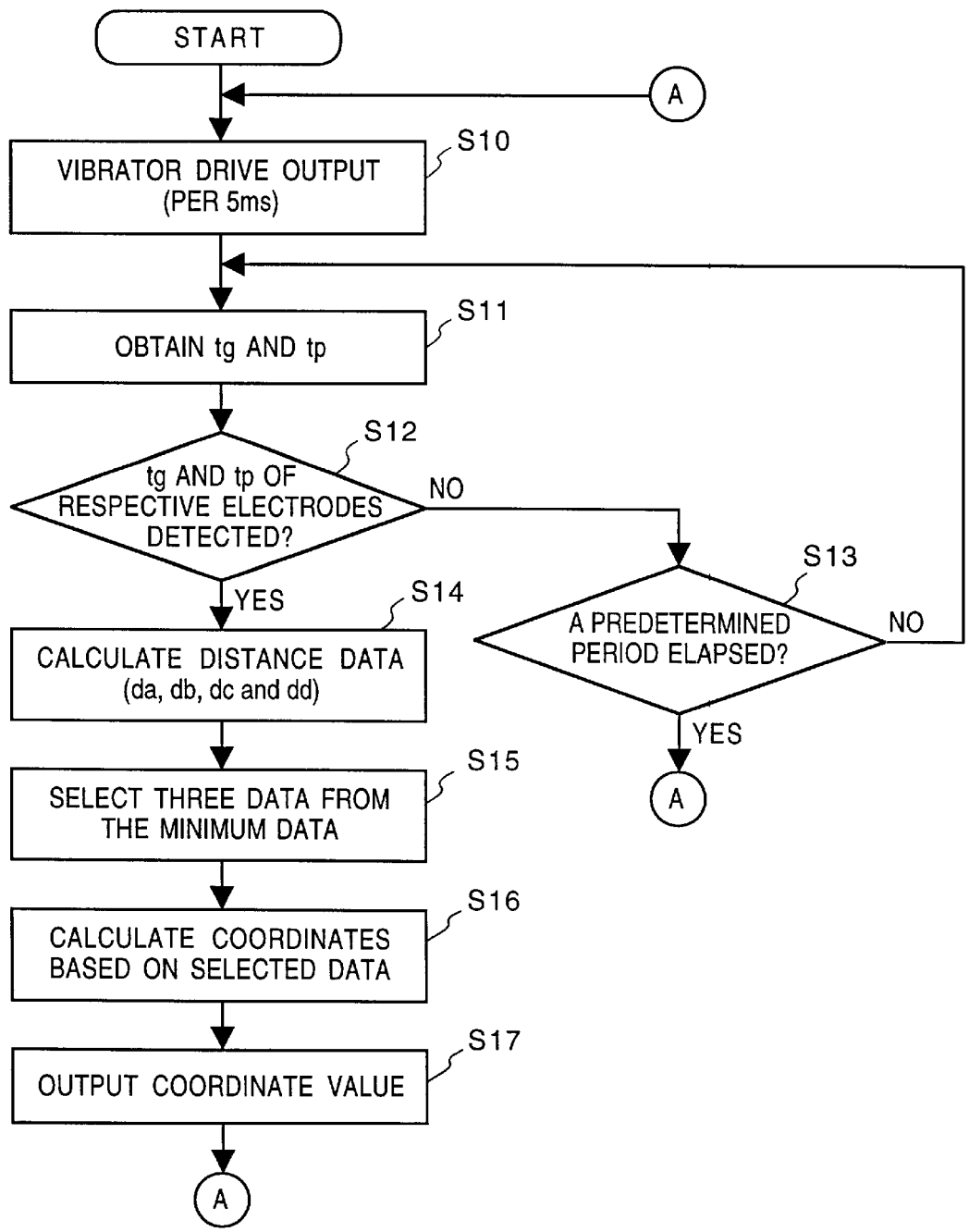
FIG. 11 is a flowchart showing a coordinate-detection procedure according to the first embodiment.

Next, the procedure of coordinate-detection according to the present embodiment will be further described with reference to the flowchart of FIG. 11. Note that a control program to realize the procedure in FIG. 11 is stored in the ROM 31c, and is executed by the CPU 31a.

At step S10, a signal instructing to drive the vibrator 4 is outputted to the vibrator driver 2. This vibrator drive signal is outputted at intervals of 5 ms, by counting the reference clocks from the clock generator 38.

At step S11, the count values of the counters 33a and 33b are read, based on the Tg and Tp signals from the signal-input circuit 35, provided in correspondence with the respective electrodes, and the read values are stored as the group delay time tg and the phase delay time tp into the RAM 31d.

Next, at step S12, whether or not the group delay time tg and the phase delay time tp of the respective electrodes 6a to 6d have been obtained is determined. If the delay time tg and tp have not been obtained from each electrode, the process proceeds to step S13, at which delay-time of the Lamb wave caused by the vibrator drive is measured until a predetermined period has elapsed. At step S13, if the predetermined period has elapsed, it is determined that the vibration-input pen 3 has not been in contact with the vibration-transmitting tablet 8 in the vibrator drive, then the process returns to step S11 for the next vibrator drive.

If it is YES at step S12, i.e., if the group delay time tg and the phase delay time tp of all the electrodes 6a to 6d have been obtained, the process proceeds to step S14, at which distance data (da, db, dc and dd) indicating the distances between the vibration-input point and the respective electrodes are calculated, in accordance with the above-described procedure, based on the delay time tg and tp of the respective electrodes.

At steps S15 and S16, coordinate value is calculated based on the obtained distance data. This procedure shown in FIG. 11 uses, not the maximum distance data, but the three other distance data, to obtain the coordinate value. That is, at step S15, three data are selected from the minimum data, from the distance data obtained at step S14. Then at step S16, the coordinate value is calculated based on the selected three distance data. At step S17, the calculated coordinate value is outputted via the I/O port 37 to the external device.

Figure 12:
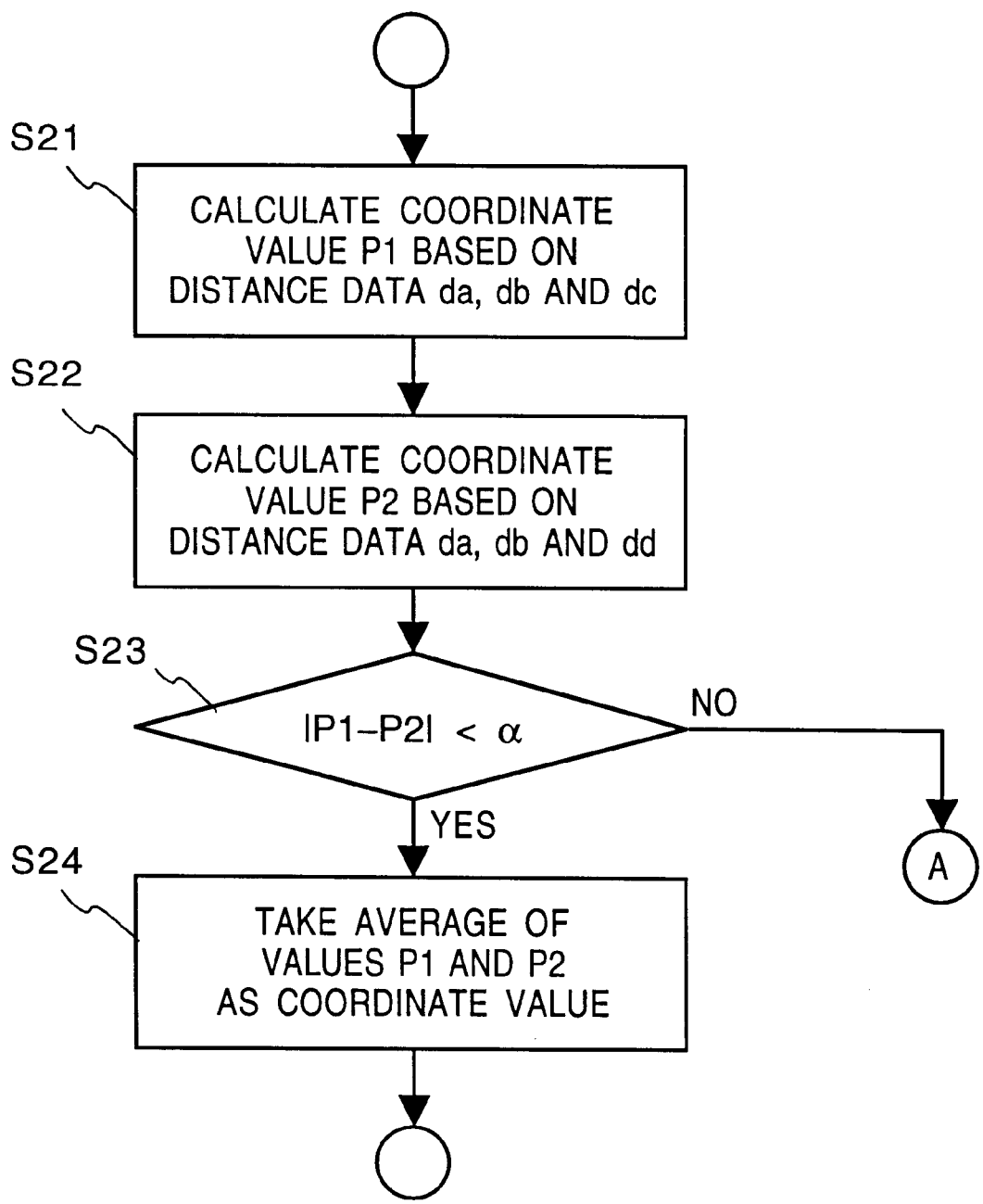
FIG. 12 is a flowchart showing another coordinate-detection procedure according to the first embodiment.

Note that in a case where the number of electrodes is more than the necessary number, other methods can be used for calculating the coordinate value. One example of these methods will be described with reference to FIG. 12. FIG. 12 is a flowchart showing a coordinate-detection procedure corresponding to steps S15 and S16 in FIG. 11.

At step S21, the coordinate value is calculated as a coordinate value P1, by using the distance data da, db and dc. At step S22, the coordinate value is calculated as a coordinate value P2, by using the distance data da, db and dd. At step S23, the distance between the coordinate values P1 and P2 is calculated, and whether or not the distance is greater than a predetermined value α is determined. If the distance between the coordinate values P1 and P2 is greater than the predetermined value α, it is determined that the current measured value is inaccurate, and the value is ignored. On the other hand, if the distance between the coordinate values P1 and P2 is less than the predetermined value α, the respective x-coordinate values and y-coordinate values of the coordinate values P1 and P2 are averaged, and the obtained average value is outputted as a coordinate value indicating the current input position.

As described above, the coordinate-input apparatus of the present embodiment comprises a piezoelectric member as an input surface (vibration-transmitting tablet), and detects vibration inputted from a vibration-input pen by electrodes formed on the vibration-transmitting tablet. In comparison with the conventional vibration detection using piezoelectric sensors and the like, the thickness of the apparatus can be reduced.

In the coordinate-input apparatus which utilizes vibration inputted onto the vibration-transmitting tablet to calculate distances between the vibration-input source and vibration-detection points and to detect the vibration-input coordinates, positioning precision of the detection devices directly influences coordinate calculation precision. For this reason, the positioning precision of the detection devices must be strictly managed. However, according to the present embodiment, the positioning only depends on, e.g., printing precision of the electrodes. In comparison with the conventional technique to attach the detection devices on the vibration-transmitting tablet, the management of positioning precision is much easier. That is, a coordinate-input apparatus can be provided with high productivity, low costs, and high performance.

[Second Embodiment]

As described in the first embodiment, the coordinate-input apparatus having the vibration-input pen 3 which utilizes a ultrasonic wave as an input device, measures delay time from a point at which vibration has been inputted from the vibration-input pen to a point at which the vibration reaches electrodes for vibration detection, and outputs the coordinate position of the vibration-input pen based on the measured delay time. The arithmetic controller simultaneously starts counters for measuring delay time, at timing of vibration-input from the vibration-input pen, thus counts time from the vibration input to detection of the vibration by the signal-waveform detector 9. Accordingly, the vibration-input pen 3 as the vibration source and the main body circuit are connected with a signal cable. A drive pulse is supplied to, e.g., a piezoelectric device in the vibration-input pen 3, in synchronization with the start of delay-time measurement.

In this manner, as the vibration-input pen 3 and the apparatus main body are connected with the cable, and the pen 3 is not cordless. However, in this apparatus utilizing a ultrasonic wave, the construction and the distance-calculation algorithm can be changed so as to omit the above synchronization, i.e., to realize a cordless coordinate-input apparatus. In the coordinate-input apparatus according to a second embodiment of the present invention, the timings of vibration generation and delay-time measurement are performed asynchronously, and the cable between the vibration-input pen 3 and the apparatus main body is omitted.

The construction of the second embodiment is the same as that of the first embodiment shown in FIG. 1, except that the vibrator driver 2 (in this case, including a power for driving) is integrated within the vibration-input pen 3, and the cable between the arithmetic controller 1 and the vibrator driver 2 is omitted. In this construction, the operation of the vibration-input pen 3 and that of the arithmetic controller 1 are not performed in synchronization. Accordingly, the distance between the vibration-input point and the electrodes cannot be directly calculated. However, the coordinates of the vibration-input point can be calculated based on the differences among vibration-arrival times at the respective electrodes. Hereinafter, an algorithm for this coordinate calculation will be described.

Again referring to FIG. 8, the four electrodes 6a to 6d are provided at positions S1 to S4 on the vibration-transmitting tablet, and straight lines da to dd represents distances from the position P of the vibration-input pen 3 as the vibration source to the respective electrodes 6a to 6d. Since the vibration-input pen 3 and the apparatus main body do not operate in synchronization, the distances da to dd cannot be directly obtained. However, it is possible to obtain the differences Δdb to Δdd, i.e., the differences between the distance da (distance between the electrode 6a and the vibration-input pen 3) and the distances db to dd (distances between the electrodes 6b to 6d and the vibration-input pen 3). That is, even though the vibration generation timing of the vibration-input pen 3 is not known, the difference between, e.g., wave-arrival times at the electrodes 6a and 6b, can be measured, and as a result, the difference between the distances da and db can be obtained. Then, based on these straight-line distance differences Δdb to Δdd, coordinates (x,y) of the position P of the vibration-input pen 3 can be obtained by the Pythagorean theorem.

First, the distances db to dd can be expressed by the calculated Δdb to Δdd as follows:

$$db = \Delta db + da \tag{14}$$

$$dc = \Delta dc + da \tag{15}$$

$$dd = \Delta dd + da \tag{16}$$

The distances between the respective electrodes and the vibration-input pen can be expressed as follows:

$$da^2 = x^2 + y^2 \tag{17}$$

$$db^2 = (\Delta db + da)^2 = x^2 + (Y-y)^2 \tag{18}$$

$$dc^2 = (\Delta dc + da)^2 = (X-x)^2 + (Y-y)^2 \tag{19}$$

$$dd^2 = (\Delta dd + da)^2 = (X-x)^2 + y^2 \tag{20}$$

X: distance between electrodes 6a and 6b

Y: distance between electrodes 6a and 6c  x: x-directional distance from electrode 6a  y: y-directional distance from electrode 6a Next, from {(18)−(17)} and {(19)−(20)}, $$\Delta db^2 + 2da \cdot \Delta db = Y^2 - 2Y \cdot y \tag{21}$$

$$\Delta dc^2 - \Delta dd^2 + 2da \cdot (\Delta dc - \Delta dd) = y^2 - 2Y \cdot y \tag{22}$$

Then, the distance da can be obtained from the difference between both equations (21) and (22):

$$da = -(\Delta db^2 + \Delta dd^2 - \Delta dc^2)/(\Delta dd + \Delta db - \Delta dc) \tag{23}$$

This equation holds when right hand denominator is not "zero". The solution of denominator "zero" will be described later. The distance y can be obtained by substituting equation (23) into equation (22):

$$y = Y/2 - \Delta db^2/2Y + \Delta db \cdot (\Delta db^2 + \Delta dd^2 - \Delta dc^2)/(\Delta dd + \Delta db - \Delta dc)/Y \tag{24}$$

Similarly, the distance x can be obtained:

$$x = X/2 - \Delta db^2/2X + \Delta dd \cdot (\Delta db^2 + \Delta dd^2 - \Delta dc^2)/(\Delta dd + \Delta db - \Delta dc)/X \tag{25}$$

Note that equation (25) holds only when $$\Delta dd + \Delta db - \Delta dc \neq 0 \tag{26}$$

holds.

Next, a case where the condition of equation (26) is not satisfied will be described. If equations (14) to (16) are substituted, the case where the right hand item is "0" is $$dd+db=dc+da \quad (27)$$

This holds when x=X/2 or y=Y/2, and da=dd and db=dc or da=db and dc=dd.

Accordingly, if it is determined that equation (26) does not hold, the coordinate calculation jumps to a subroutine to perform the following calculation processing having x or y quadratic equations.

First, when x=X/2 holds (Δdd=Δdc in this case), equations (17) to (20) become as follows:

$$da^2 = X^2/4 + y^2 \quad (28)$$

$$(\Delta db + da)^2 = X^2/4 + (Y-y)^2 \quad (29)$$

The obtained distance da from (29)–(28) is substituted into equation (28), then the distance y can be obtained as follows:

$$y = (Y \pm \sqrt{A})/2 \quad (30)$$

$$A = \Delta db^2 \cdot (1 + X^2/(Y^2 - \Delta db^2)) \quad (31)$$

Note that the sign of equation (30) is "−" when Δdb>0 holds, while "+" when Δdb<0 holds.

Similarly, when y=Y/2 holds, the distance x can be obtained as follows:

$$x = (X \pm \sqrt{B})/2 \quad (32)$$

$$B = \Delta db^2 \cdot (1 + Y^2/-(X^2 - \Delta dd^2)) \quad (33)$$

Note that the sign of equation (32) is "−" when Δdd>0 holds, while "+" when Δdd<0 holds.

As described above, the coordinates of the position of the vibration-input pen 3 can be detected in real-time manner.

Figure 13:
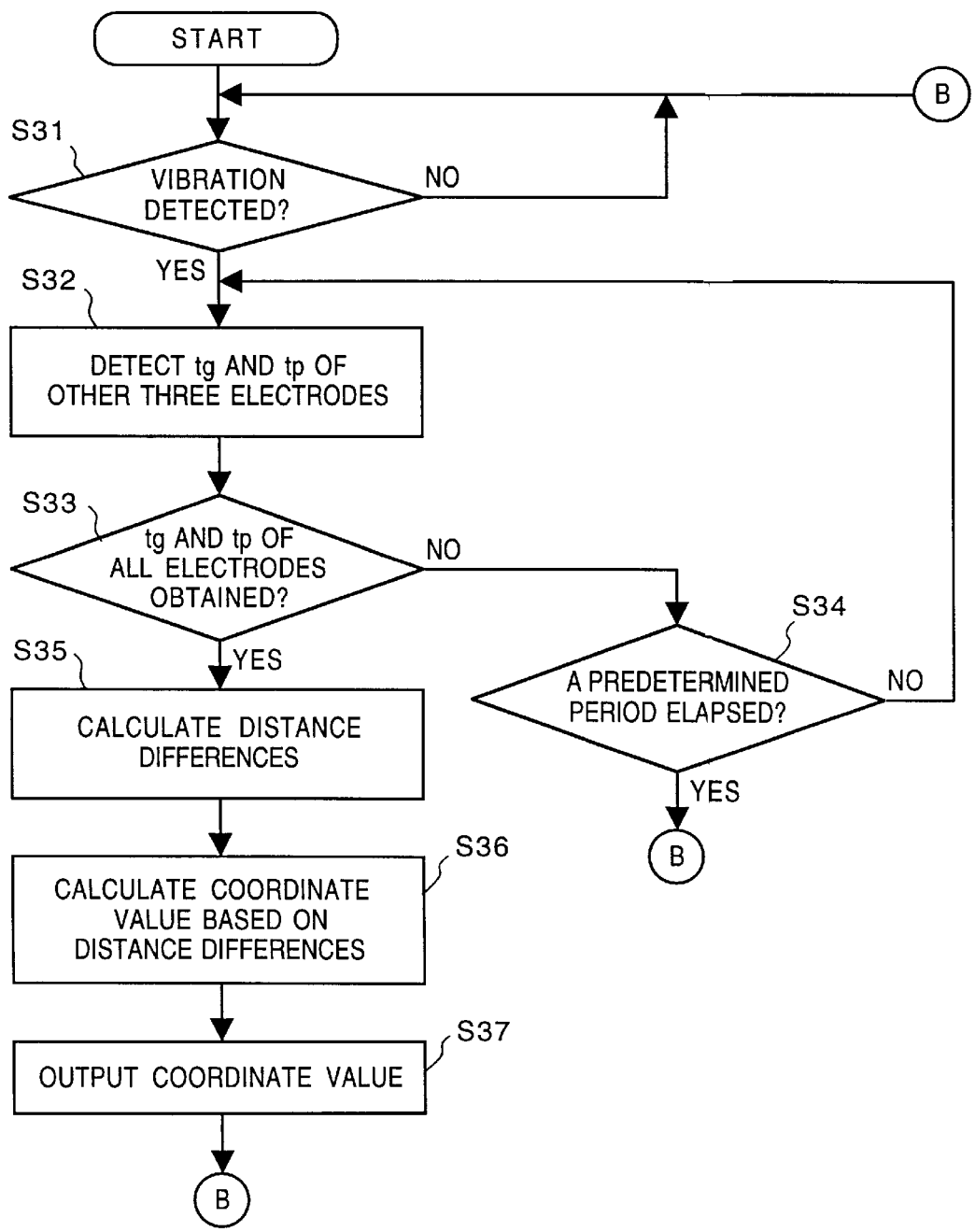
FIG. 13 is a flowchart showing a coordinate-detection procedure according to a second embodiment.

Next, the procedure of coordinate calculation according to the second embodiment will be described with reference to the flowchart of FIG. 13. Note that a control program to realize the control procedure shown in FIG. 13 is stored in the ROM 31c, and is executed by the CPU 31a.

At step S31, whether or not vibration voltage has been detected from an electrode is determined. If YES, i.e., the vibration voltage has been detected, the process proceeds to step S32, at which counting by the counter 33a and 33b are started, and delay time tg and tp at the other three electrodes (delay time based on time of arrival of vibration at the one electrode as reference time) are obtained.

At step S33, whether or not delay time of all the three electrodes have been obtained is determined. If NO, the process proceeds to step S34. At step S34, it is determined whether or not a predetermined period has elapsed since vibration arrival was initially detected. If NO, the measurement of delay time at the three electrodes are continued. If YES, i.e., the predetermined period has elapsed, it is determined that the initial vibration-arrival detection was noise, then the detected signal is ignored, and the process returns to step S31.

If it is determined at step S33 that the delay time at the three electrodes have been obtained, the process proceeds to step S35. At step S35, the differences among distances between the respective electrodes and the vibration-input point are calculated based on the receptive delay time obtained 15 at step S32. At step S36, the coordinate value of the vibration-input point is obtained based on the distance differences obtained at step S35. At step S37, the obtained coordinate value is outputted to an external device via the I/O port 37.

By this calculation processing, a vibration-input position of the vibration-input pen 3 can be calculated without timing information on the vibration generated by the vibration-input pen 3. Accordingly, though the coordinate-input apparatus has a cordless vibration-input pen 3, the apparatus can be formed with a simple circuit construction without reception circuits or the like for drive timing reception.

Further, in addition to the advantage of the first embodiment, the second embodiment omits the cord connecting the vibration-input pen and the apparatus main body, thus improving operability.

As described above, according to the present invention, electric signals generated in accordance with mechanical vibration can be detected from electrodes, by utilizing a piezoelectric member as a vibration-transmitting tablet. That is, as the electrodes are simply provided on the vibration-transmitting tablet, such arrangement of electrodes can be attained by a technique such as etching or printing. Thus, management of precision in vibration-detection position can be much easier.

Further, in comparison with the conventional coordinate-input apparatuses, the thickness of the apparatus according to the present invention can be thinner.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A coordinate-input apparatus comprising:
   a vibration-transmitting tablet polarized in its thickness direction and having piezoelectricity;
   at least three spot-like electrodes, arranged at corners of a first surface of the vibration-transmitting tablet;

an opposite electrode arranged on a second surface of the vibration-transmitting tablet covering at least the area corresponding to the back of the electrodes on the first surface, the second surface being a surface opposed to the first surface;

vibration-input means for generating vibration and inputting the generated vibration onto the vibration-transmitting tablet;

detection means for obtaining electric signals generated by the vibration inputted by said vibration-input means and propagated on the vibration-transmitting tablet to the spot-like electrodes and detecting arrival of the vibration at the spot-like electrodes based on the electric signals;

calculation means for calculating coordinates of an input position of the vibration, based on timings of detection of the arrival of the vibration at the spot-like electrodes by said detection means; and output means for outputting coordinate data calculated by said calculation means.

2. The coordinate-input apparatus according to claim 1, wherein the opposite electrode covers approximately all of second surface of the vibration-transmitting tablet, and the opposite electrode is connected to the ground.

3. The coordinate-input apparatus according to claim 1, wherein said calculation means measures time from a point of generation of the vibration by said vibration-input means to a point of detection of the vibration by said detection means, calculates distances between the input position of the vibration and the spot-like electrodes based on the measured time, and calculates the coordinates of the input position based on the distances.

4. The coordinate-input apparatus according to claim 3, wherein the spot-like electrodes are more than a number necessary for said calculation means, and wherein said calculation means calculates the coordinates by a plurality of combinations of the distances between the input position and the spot-like electrodes, and determines a coordinate value based on obtained plural coordinate values.

5. The coordinate-input apparatus according to claim 3, wherein said calculation means employs distance data from the shortest distance data, from a plurality of calculated distance data, to calculate the coordinate value of the input position.

6. The coordinate-input apparatus according to claim 1, wherein said calculation means calculates time differences among arrival times of the vibration generated by said vibration-input means at the spot-like electrodes based on arrival timings of the vibration detected by said detection means, and calculates the coordinates of the input position based on the time differences.

7. The coordinate-input apparatus according to claim 6, wherein said calculation means detects distance differences among distances between the input position and the spot-like electrodes based on the time differences, and calculates the coordinates of the input position based on the distance differences.

8. The coordinate-input apparatus according to claim 6, wherein said vibration-input means and said detection means are not electrically connected.

9. The apparatus according to claim 1, wherein the spot-like electrode has a substantially circular shape.

10. The apparatus according to claim 1, wherein the opposite electrode comprises a plurality of spot-like electrodes arranges at areas corresponding to the spot-like electrodes on the first surface of the vibration transmitting tablet.

11. The apparatus according to claim 1, wherein the spot-like electrode has a substantially elliptical shape.

12. A control method for a coordinate-input apparatus, comprising a vibration-transmitting tablet being polarized in its thickness direction and having piezoelectricity, at least three spot-like electrodes, arranged at corners of a first surface of the vibration-transmitting tablet, and an opposite electrode arranged on a second surface of the vibration-transmitting tablet covering at least the area corresponding to the back of the electrodes on the first surface, the second surface being a surface opposed to the first surface, comprising:

a vibration-input step of generating vibration and inputting the generated vibration onto the vibration-transmitting tablet;

a detection step of obtaining electric signals generated by the vibration inputted at said vibration-input step and propagated on the vibration-transmitting tablet to the spot-like electrodes and detecting arrival of the vibration at the spot-like electrodes based on the electric signals;

a calculation step of calculating coordinates of an input position of the vibration, based on timings of detection of the arrival of the vibration at the spot-like electrodes at said detection step; and an output step of outputting coordinate data calculated at said calculation step.

13. The control method according to claim 12, wherein at said calculation step, time from a point of generation of the vibration at said vibration-input step to a point of detection of the vibration at said detection step is measured, distances between the input position of the vibration and the spot-like electrodes are calculated based on the measured time, and the coordinates of the input position are calculated based on the distances.

14. The control method according to claim 13, wherein the spot-like electrodes are more than a number necessary at said calculation step, and wherein at said calculation step, the coordinates are calculated by a plurality of combinations of the distances between the input position and the spot-like electrodes, and a coordinate value is determined based on obtained plural coordinate values.

15. The control method according to claim 14, wherein at said calculation step, distance data from the shortest distance data are employed, from a plurality of calculated distance data, to calculate the coordinate value of the input position.

16. The control method according to claim 12, wherein at said calculation step, time differences among arrival times of the vibration generated at said vibration-input step at the electrodes are calculated based on arrival timings of the vibration detected at said detection step, and the coordinates of the input position are calculated based on the time differences.

17. The control method according to claim 16, wherein at said calculation step, distance differences among distances between the input position and the electrodes are detected-based on the time differences, and the coordinates of the input position are calculated based on the distance differences.

18. The method according to claim 12, wherein the spot-like electrode has a substantially circular shape.

19. The method according to claim 12, wherein the spot-like electrode has a substantially elliptical shape.

20. A coordinate-input apparatus comprising:

an input-pen including a vibrator;

a vibration-transmitting tablet polarized in its thickness direction and having piezoelectricity;

detection means for detecting a vibration generated by the input-pen, by detecting an electric signal from a plurality of spot-like electrodes formed on at least three corners of the vibration-transmitting tablet;

measuring means for measuring a time period from when a vibration generated by the input-pen is input into the vibration-transmitting tablet to when the vibration is detected at each of the plurality of spot-like electrodes by said detection means; and calculation means for calculating coordinates of a point where the vibration is input based on the measuring result of said measuring means.

21. A coordinate-input apparatus comprising:

a vibration-transmitting tablet being polarized in its thickness direction and having piezoelectricity;

detection means for detecting a vibration inputted into the vibration-transmitting tablet, by detecting an electric signal from a plurality of spot-like electrodes formed on at least three corners of the vibration-transmitting tablet;

measuring means for measuring a time period from when a vibration is input into the vibration-transmitting tablet to when the vibration is detected at each of the plurality of spot-like electrodes by said detection means; and calculation means for calculating coordinates of a point where the vibration is input based on the measuring result of said measuring means.

* * * * *

UNITED STATES PATENT AND TRADEMARK OFFICE
CERTIFICATE OF CORRECTION

PATENT NO. : 5,936,207
DATED : Aug. 10, 1999
INVENTOR(S) : Katsuyuki Kobayashi, et al It is certified that error appears in the above-identified patent and that said Letters Patent is hereby corrected as shown below:

The title page, should be deleted to be replaced with the attached title page.

Figure 9:
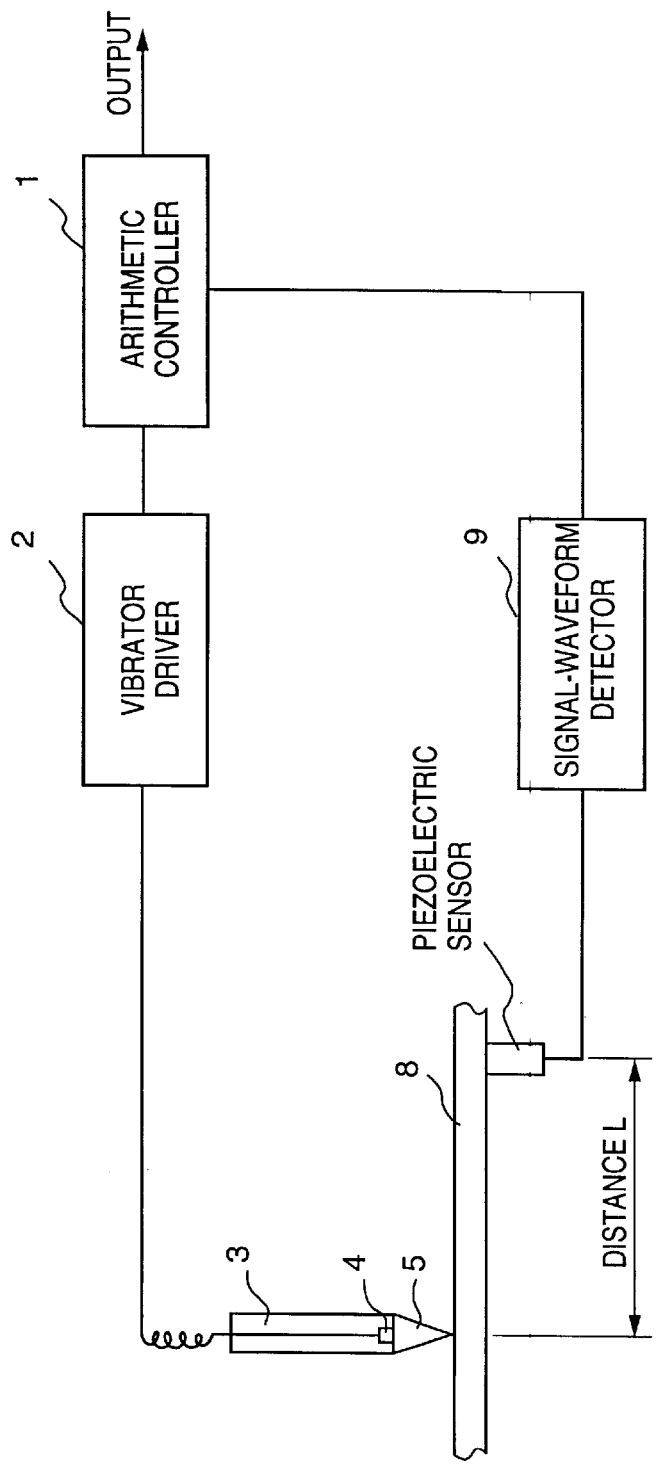
FIG. 9 is a block diagram showing attachment of a piezoelectric sensor in a conventional coordinate-input apparatus.

The drawing sheets, consisting of Figs. 1 and 9, should be deleted to be replaced with the drawing sheets, consisting of Figs. 1 and 9, as shown on the attached pages.

United States Patent [19]

Kobayashi et al.

[11] Patent Number: 5,936,207
[45] Date of Patent: Aug. 10, 1999

[54] VIBRATION-TRANSMITTING TABLET AND COORDINATE-INPUT APPARATUS USING SAID TABLET

[75] Inventors: Katsuyuki Kobayashi, Yokohama; Atsushi Tanaka, Yamato; Yuichiro Yoshimura, Kamakura; Ryozo Yanagisawa, Inzaimachi; Masaki Tokioka, Fujisawa; Hajime Sato, Yokohama, all of Japan

[73] Assignee: Canon Kabushiki Kaisha, Tokyo, Japan

[21] Appl. No.: 08/683,222

[22] Filed: Jul. 18, 1996

[51] Int. Cl.$^6$ ............................ G08C 21/00; G09G 5/00
[52] U.S. Cl. ..................... 178/18.01; 178/18.03; 178/18.04; 345/176; 345/177
[58] Field of Search ............................. 345/175, 176, 345/177, 179; 178/18.01, 18.03, 18.04, 19.02, 20.01

[56] References Cited

U.S. PATENT DOCUMENTS

| | | | |
|---|---|---|---|
| 4,833,279 | 5/1989 | Chen et al. | 178/18 |
| 4,886,943 | 12/1989 | Suzuki et al. | 178/18 |
| 4,887,245 | 12/1989 | Mori et al. | 367/129 |
| 4,897,510 | 1/1990 | Tanaka et al. | 178/18 |
| 4,931,965 | 6/1990 | Kaneko et al. | 178/18 |
| 4,980,518 | 12/1990 | Kobayashi et al. | 345/177 |
| 5,017,913 | 5/1991 | Kaneko et al. | 340/177 |
| 5,097,102 | 3/1992 | Yoshimura et al. | 178/18 |
| 5,142,106 | 8/1992 | Yoshimura et al. | 178/18 |
| 5,177,472 | 1/1993 | Taniishi | 345/179 |
| 5,239,138 | 8/1993 | Kobayashi et al. | 178/18 |
| 5,500,492 | 3/1996 | Kobayashi et al. | 178/18 |
| 5,539,678 | 7/1996 | Tanaka et al. | 364/561 |
| 5,565,893 | 10/1996 | Sato | 345/177 |
| 5,570,299 | 10/1996 | Tokioka | 178/18 |

FOREIGN PATENT DOCUMENTS

| | | |
|---|---|---|
| 63-00619 | 1/1988 | Japan. |
| 5-60615 | 9/1993 | Japan. |

*Primary Examiner*—Vijay Shankar
*Attorney, Agent, or Firm*—Fitzpatrick, Cella, Harper & Scinto

[57] ABSTRACT

A vibration-transmitting tablet and coordinate-input apparatus at low prices, which enable to easily manage precision of vibration detection position. A vibration-input pen inputs vibration, generated by its vibrator, onto the vibration-transmitting tablet formed by polarizing a piezoelectric member in its thickness direction. When the vibration propagated on the vibration-transmitting tablet reaches four electrodes provided at predetermined positions of the vibration-transmitting tablet, electric signals based on the vibration are detected from the respective electrodes. A signal-waveform detector detects arrival of the vibration at the electrodes based on the electric signals. An arithmetic controller calculates coordinates of the vibration-input position based on arrival timings of the vibration. The arrangement of the electrodes on the vibration-transmitting tablet can be realized by etching, printing or the like, thus management of precision of vibration-detection positions can be much easier.

21 Claims, 13 Drawing Sheets

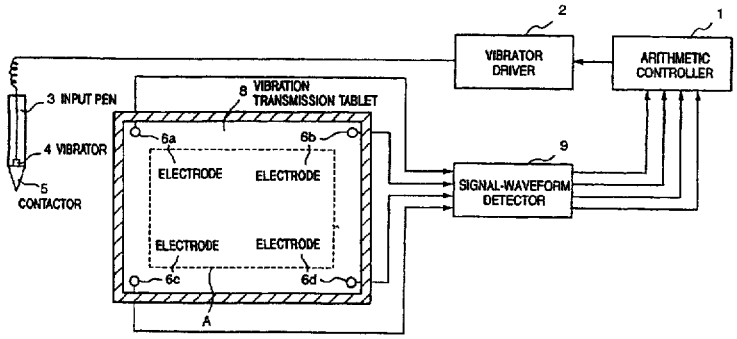

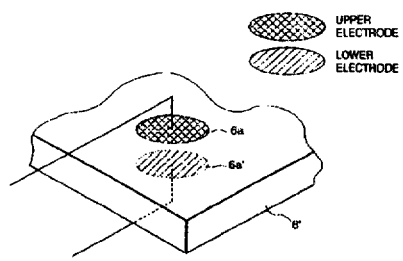

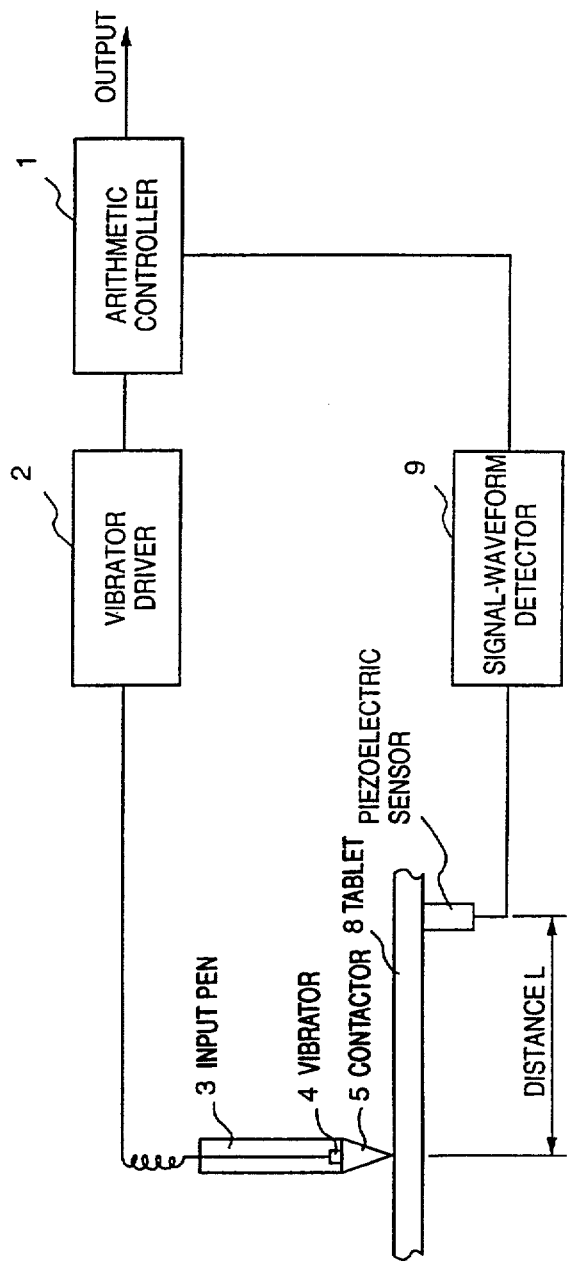

UNITED STATES PATENT AND TRADEMARK OFFICE
CERTIFICATE OF CORRECTION

PATENT NO. : 5,936,207

DATED : August 10, 1999

INVENTOR(S): KATSUYUKI KOBAYASHI, ET AL.

It is certified that error appears in the above-identified patent and that said Letters Patent is hereby corrected as shown below:

COVER PAGE AT ITEM [56] U.S. PATENT DOCUMENTS:
"5,565,893 10/1996 Sato" should read --5,565,893 10/1996 Sato et al.--; and
Insert: --3,790,709 02/1975 Heywang....178/18--, --3,806,642 04/1974 Veith et al.....178/18--, and --3,808,364 04/1974 Veith....178/19--.

COVER PAGE AT ITEM [30] PRIORITY DATA:
Insert: --July 19, 1995 Japan 7-182559--.

SHEET NO. 1:
Figure 1, insert attached sheet.

SHEET NO. 3:
Figure 4, "DICISION" should read --DECISION--.

SHEET NO. 8:
Figure 9, insert attached sheet.

COLUMN 8:
Line 66, "to" (2nd occurrence) should be deleted.

UNITED STATES PATENT AND TRADEMARK OFFICE
CERTIFICATE OF CORRECTION

PATENT NO. : 5,936,207

DATED : August 10, 1999

INVENTOR(S): KATSUYUKI KOBAYASHI, ET AL.

It is certified that error appears in the above-identified patent and that said Letters Patent is hereby corrected as shown below:

COLUMN 10:
Line 15, "disstance LO" should read --distance LO--; and
Line 16, "disstance LO" should read --distance LO--.

COLUMN 13:
Line 27, "a" should read --an--; and
Line 44, "a" should read --an--.

COLUMN 14:
Line 3, "represents" should read --represent--.

COLUMN 15:
Line 63, "obtained 15" should read --obtained--.

COLUMN 17:
Line 22, "of" should read --of the--.

UNITED STATES PATENT AND TRADEMARK OFFICE
CERTIFICATE OF CORRECTION

PATENT NO. : 5,936,207

DATED : August 10, 1999

INVENTOR(S): KATSUYUKI KOBAYASHI, ET AL.

It is certified that error appears in the above-identified patent and that said Letters Patent is hereby corrected as shown below:

<u>COLUMN 18</u>:
Line 3, "arranges" should read --arranged--; and
Line 66, "detected-" should read --detected--.

Signed and Sealed this

Sixth Day of June, 2000

Q. TODD DICKINSON

*Attest:*

*Attesting Officer*  *Director of Patents and Trademarks*